(12) United States Patent
Mandal et al.

(10) Patent No.: US 7,273,026 B2
(45) Date of Patent: *Sep. 25, 2007

(54) ROLLER FOLLOWER BODY

(75) Inventors: Dhruva Mandal, Vernon Hills, IL (US); Carroll Williams, Pocahontas, AR (US)

(73) Assignee: MacLean-Fogg Company, Mundelein, IL (US)

( * ) Notice: Subject to any disclaimer, the term of this patent is extended or adjusted under 35 U.S.C. 154(b) by 459 days.

This patent is subject to a terminal disclaimer.

(21) Appl. No.: 10/316,261

(22) Filed: Oct. 18, 2002

(65) Prior Publication Data

US 2005/0000314 A1    Jan. 6, 2005

(51) Int. Cl.
*F01L 1/14*    (2006.01)
(52) U.S. Cl. .............................. 123/90.48; 123/90.52; 123/90.55; 123/90.45; 123/198 F; 29/888.43; 74/569
(58) Field of Classification Search ............. 123/90.48, 123/90.51–90.56, 90.2, 90.35, 90.43, 90.45, 123/198 F, 90.15, 90.16; 92/51–53; 29/888.43; 74/569
See application file for complete search history.

(56) References Cited

U.S. PATENT DOCUMENTS

| | | | | |
|---|---|---|---|---|
| 188,764 A | 3/1877 | Adams | ........................ | 403/157 |
| 626,594 A | 6/1899 | Chapman | .................... | 137/495 |
| 703,838 A | 7/1902 | Scobee | ........................ | 384/375 |
| 794,683 A | 7/1905 | Riotte | ........................ | 123/41 R |
| 872,598 A | 12/1907 | Watts et al. | ............. | 123/90.32 |
| 948,248 A | 2/1910 | Reaugh | ........................ | 60/627 |
| 992,089 A | 5/1911 | Watt | ........................ | 123/41 R |
| 993,875 A | 5/1911 | Richards et al. | .......... | 123/188.2 |
| 1,000,722 A | 5/1911 | Danver | ........................ | 384/13 |
| 1,001,265 A | 5/1911 | Graham | ...................... | 403/276 |
| 1,061,700 A | 5/1913 | Steinbecker | ................. | 74/569 |
| 1,066,069 A | 7/1913 | Willshaw | ................. | 123/90.16 |
| 1,080,733 A | 12/1913 | Thomson | .................... | 123/346 |
| 1,084,514 A | 1/1914 | Whitlock | ...................... | 123/87 |
| 1,101,934 A | 6/1914 | Jacobs et al. | ............. | 123/182.1 |
| 1,129,555 A | 2/1915 | Curran | .................... | 123/90.28 |
| 1,198,115 A | 9/1916 | De La Bar | ................. | 222/482 |
| 1,210,871 A | 1/1917 | Suffa | ........................ | 123/90.35 |
| 1,220,380 A | 3/1917 | Turner | ...................... | 123/90.39 |
| 1,245,552 A | 11/1917 | Becket | ........................ | 420/11 |
| 1,246,343 A | 11/1917 | Snadecki | ................. | 123/90.52 |
| 1,247,366 A | 11/1917 | Brockway | ................. | 123/90.51 |
| 1,252,692 A | 1/1918 | Harris | ...................... | 123/79 R |

(Continued)

OTHER PUBLICATIONS

"GM Displacement on Demand," Jim Kerr, Canadian Driver, Oct. 25, 2002.

(Continued)

*Primary Examiner*—Thomas Denion
*Assistant Examiner*—Kyle M. Riddle
(74) *Attorney, Agent, or Firm*—Dana Andrew Alden

(57) ABSTRACT

The present invention relates to a roller follower, comprising an outer surface, enclosing a first cavity, a second cavity, and a transition opening, wherein the first cavity includes a first inner surface configured to house a cylindrical insert the second cavity includes a second inner surface configured to house an inner body, and the transition opening links the first cavity with the second cavity; and at least one of the cavities is fabricated through forging.

78 Claims, 13 Drawing Sheets

U.S. PATENT DOCUMENTS

| | | | |
|---|---|---|---|
| 1,254,227 A | 1/1918 | Huber | 384/13 |
| 1,292,312 A | 1/1919 | Gronkwist | 184/6.5 |
| 1,331,787 A | 2/1920 | Schlatter | 123/325 |
| 1,336,447 A | 4/1920 | Suffa | 123/90.49 |
| 1,345,942 A | 7/1920 | McCain | 29/888.43 |
| 1,350,989 A | 8/1920 | Cox | 70/237 |
| 1,354,852 A | 10/1920 | Schneider | 184/6.5 |
| 1,358,459 A | 11/1920 | Pache | 123/198 F |
| 1,363,398 A | 12/1920 | Davids | 123/90.53 |
| 1,374,059 A | 4/1921 | Church | 123/90.48 |
| 1,377,866 A | 5/1921 | White | 384/291 |
| 1,399,839 A | 12/1921 | Alborn | 123/90.5 |
| 1,409,625 A | 3/1922 | Vosbrink | 105/62.2 |
| 1,409,878 A | 3/1922 | Mainland | 384/28 |
| 1,410,771 A | 3/1922 | Strohl | 123/90.47 |
| 1,422,698 A | 7/1922 | Pagé | 44/507 |
| 1,427,111 A | 8/1922 | Knudsen | 123/88.1 |
| 1,461,530 A | 7/1923 | Rich | 123/90.51 |
| 1,464,082 A | 8/1923 | Leo | 123/90.61 |
| 1,475,557 A | 11/1923 | Albrecht | 123/90.49 |
| 1,479,735 A | 1/1924 | Page | 123/90.48 |
| 1,515,201 A | 11/1924 | Hewitt | 123/90.39 |
| 1,537,529 A | 5/1925 | Enberg | 76/114 |
| 1,543,438 A | 6/1925 | Hutt | 123/90.49 |
| 1,565,223 A | 12/1925 | Church | 123/90.5 |
| 1,566,923 A | 12/1925 | Roberts | 384/261 |
| 1,573,962 A | 2/1926 | Charnock | 123/90.22 |
| 1,582,883 A | 4/1926 | Rich | 123/90.51 |
| 1,594,471 A | 8/1926 | Short | 123/90.61 |
| 1,605,494 A | 11/1926 | Anderson | 123/90.61 |
| 1,607,128 A | 11/1926 | Johansen | 123/90.19 |
| 1,613,012 A | 1/1927 | Baker | 123/90.49 |
| 1,623,826 A | 4/1927 | Burleson | 123/90.28 |
| 1,674,310 A | 6/1928 | Topping | 470/18 |
| 1,682,821 A | 9/1928 | Woolson | 123/90.33 |
| 1,696,866 A | 12/1928 | Seaman | 123/90.49 |
| 1,728,149 A | 9/1929 | Berne | 123/90.47 |
| 1,735,695 A | 11/1929 | Rich | 123/90.51 |
| 1,741,093 A | 12/1929 | Briggs | 70/367 |
| 1,741,230 A | 12/1929 | Goodwin | 123/41.41 |
| 1,748,086 A | 2/1930 | Small | 74/569 |
| 1,784,257 A | 12/1930 | Thomas | 123/90.19 |
| 1,797,105 A | 3/1931 | Shoblom | 123/321 |
| 1,798,738 A | 3/1931 | Hoern | 403/122 |
| 1,798,938 A | 3/1931 | Hallett | 123/90.57 |
| 1,802,330 A | 4/1931 | Boland | 123/90.5 |
| 1,820,299 A | 8/1931 | Church | 123/90.5 |
| 1,834,285 A | 12/1931 | Loeffler | 184/6.5 |
| 1,835,622 A | 12/1931 | Willgoos | 123/90.35 |
| 1,840,633 A | 1/1932 | Morehouse | 184/6.9 |
| 1,844,021 A | 2/1932 | Stewart | 123/90.35 |
| 1,847,312 A | 3/1932 | Seufert | 352/188 |
| 1,848,083 A | 3/1932 | Wetherald | 29/888.452 |
| 1,874,471 A | 8/1932 | Du Bois | 123/90.33 |
| 1,899,251 A | 2/1933 | Zerk | 138/41 |
| 1,907,506 A | 5/1933 | Coburn | 411/516 |
| 1,915,867 A | 6/1933 | Penick | 138/42 |
| 1,930,261 A | 10/1933 | Berry | 123/90.5 |
| 1,930,368 A | 10/1933 | Nelson | 184/6.9 |
| 1,930,568 A | 10/1933 | Short | 123/90.43 |
| 1,955,844 A | 4/1934 | Woolman | 123/90.27 |
| 1,956,014 A | 4/1934 | Fink et al. | 123/188.1 |
| 1,962,057 A | 6/1934 | Clutterbuck | 123/90.54 |
| 1,968,982 A | 8/1934 | Baranaby et al. | 184/6.9 |
| 1,971,083 A | 8/1934 | Schlaa | 29/898.066 |
| 1,977,778 A | 10/1934 | Rice | 123/90.55 |
| 1,985,447 A | 12/1934 | Grubbs | 123/90.12 |
| 2,000,635 A | 5/1935 | Edwards | 184/6.9 |
| 2,002,196 A | 5/1935 | Ucko | 123/321 |
| 2,015,991 A | 10/1935 | Breeler | 420/34 |
| 2,019,138 A | 10/1935 | Kliesrath et al. | 123/90.49 |
| 2,019,252 A | 10/1935 | Cottingham | 123/90.12 |
| 2,027,406 A | 1/1936 | Spatta | 72/306 |
| 2,036,936 A | 4/1936 | Halford | 123/90.46 |
| 2,051,415 A | 8/1936 | Payson | 148/325 |
| 2,053,743 A | 9/1936 | Russell | 123/90.46 |
| 2,055,341 A | 9/1936 | Dyer | 29/888.43 |
| 2,067,114 A | 1/1937 | Ashton | 123/90.61 |
| 2,071,051 A | 2/1937 | Van Ranst | 123/90.44 |
| 2,071,719 A | 2/1937 | Wurtele | 123/296 |
| 2,073,178 A | 3/1937 | Rich | 123/188.3 |
| 2,081,390 A | 5/1937 | Trapp | 74/569 |
| 2,089,478 A | 8/1937 | Heiss | 123/90.5 |
| 2,091,451 A | 8/1937 | Phillips | 70/491 |
| 2,091,674 A | 8/1937 | Dostal | 123/21 |
| 2,097,413 A | 10/1937 | Hurst et al. | 123/90.51 |
| 2,098,115 A | 11/1937 | Voorhies | 417/494 |
| 2,107,456 A | 2/1938 | Trapp | 74/55 |
| 2,109,815 A | 3/1938 | Best | 123/90.59 |
| 2,114,655 A | 4/1938 | Leibing | 123/184.39 |
| 2,116,749 A | 5/1938 | Daisley | 123/90.55 |
| 2,117,434 A | 5/1938 | Krebs | 123/188.1 |
| 2,120,389 A | 6/1938 | Bettison | 123/90.49 |
| 2,127,245 A | 8/1938 | Breeler | 420/56 |
| 2,131,948 A | 10/1938 | Graham | 411/518 |
| 2,142,224 A | 1/1939 | Turlay | 123/90.65 |
| 2,151,832 A | 3/1939 | Bugatti | 74/569 |
| 2,154,494 A | 4/1939 | Corlett | 123/90.52 |
| 2,163,969 A | 6/1939 | Whalen | 123/90.55 |
| 2,166,968 A | 7/1939 | Rohlin | 123/184.32 |
| 2,174,526 A | 10/1939 | Parker | 417/297 |
| 2,175,466 A | 10/1939 | Johnson | 123/90.5 |
| 2,179,354 A | 11/1939 | Scott | 123/496 |
| 2,185,991 A | 1/1940 | Voorhies et al. | 123/90.55 |
| 2,187,008 A | 1/1940 | Baxter | 125/90.59 |
| 2,199,096 A | 4/1940 | Berglund | 420/12 |
| 2,207,324 A | 7/1940 | L'Orange | 92/73 |
| 2,209,479 A | 7/1940 | Spencer | 74/559 |
| 2,227,127 A | 12/1940 | Dillström | 123/451 |
| 2,247,278 A | 6/1941 | Daisley | 123/90.51 |
| 2,247,299 A | 6/1941 | Klavik | 384/155 |
| 2,250,011 A | 7/1941 | Dayton | 123/90.19 |
| 2,250,814 A | 7/1941 | Rohlin | 123/90.62 |
| 2,272,074 A | 2/1942 | Voorhies | 123/90.55 |
| 2,280,753 A | 4/1942 | Essl | 123/90.54 |
| 2,308,858 A | 1/1943 | Burkhardt | 123/90.53 |
| 2,309,740 A | 1/1943 | Voorhies | 74/569 |
| 2,322,172 A | 3/1943 | Spencer | 184/6.9 |
| 2,319,546 A | 5/1943 | Insley et al. | 29/888.061 |
| 2,322,173 A | 6/1943 | Spencer | 123/90.36 |
| 2,322,174 A | 6/1943 | Spencer | 384/154 |
| 2,322,195 A | 6/1943 | Mock | 251/229 |
| 2,324,322 A | 7/1943 | Reese et al. | 148/545 |
| 2,339,238 A | 1/1944 | Buckley | 123/90.16 |
| 2,344,285 A | 3/1944 | Cormode | 72/354.6 |
| 2,346,737 A | 4/1944 | Essl | 123/41 R |
| 2,349,203 A | 5/1944 | Spencer | 184/6.9 |
| 2,356,900 A | 8/1944 | Voorhies | 123/90.56 |
| 2,381,339 A | 8/1945 | Doman | 123/90.35 |
| 2,385,309 A | 9/1945 | Spencer | 74/519 |
| 2,386,317 A | 10/1945 | Jenny et al. | 123/90.35 |
| 2,392,933 A | 1/1946 | Mallory | 123/53.5 |
| 2,394,738 A | 2/1946 | Anthony | 123/90.12 |
| 2,405,927 A | 8/1946 | Tornblom | 138/42 |
| 2,408,325 A | 9/1946 | Luce et al. | 72/276 |
| 2,410,411 A | 11/1946 | Gregory | 123/90.16 |
| 2,434,386 A | 1/1948 | Bradshaw | 123/90.46 |
| 2,435,727 A | 2/1948 | Spencer | 74/569 |
| 2,438,631 A | 3/1948 | Bergmann | 123/90.59 |
| 2,443,999 A | 6/1948 | Wright | 123/182.1 |
| 2,451,395 A | 10/1948 | Klukan | 125/11.22 |
| 2,483,779 A | 10/1949 | Mucher | 188/83 |
| 2,485,760 A | 10/1949 | Millis et al. | 420/19 |
| 2,494,128 A | 1/1950 | Holmquist et al. | 72/340 |

| | | | | | | | |
|---|---|---|---|---|---|---|---|
| 2,508,557 A | 5/1950 | Wood, Jr. .................... 74/569 | | 2,938,508 A | 5/1960 | Papenguth ............... 123/90.59 |
| 2,516,775 A | 7/1950 | Johansen ................... 417/494 | | 2,942,595 A | 6/1960 | Bergmann, Sr. et al. .. 123/90.55 |
| 2,518,272 A | 8/1950 | Beckwith ...................... 4/239 | | 2,988,805 A | 6/1960 | Thompson ................ 29/888.43 |
| 2,522,326 A | 9/1950 | Winter, Jr. .................... 74/519 | | 2,947,298 A | 8/1960 | Dolza ......................... 123/580 |
| 2,526,239 A | 10/1950 | Kincaid, Jr. .................. 74/127 | | 2,948,270 A | 8/1960 | Bergmann .................. 123/90.1 |
| 2,527,604 A | 10/1950 | Walk ........................... 222/5 | | 2,948,274 A | 8/1960 | Wood ...................... 123/148 R |
| 2,528,983 A | 11/1950 | Weiss .......................... 123/333 | | 2,954,015 A | 9/1960 | Line ......................... 123/90.35 |
| 2,542,036 A | 2/1951 | Knaggs .................... 123/90.59 | | 2,956,557 A | 10/1960 | Dadd ....................... 123/90.55 |
| 2,548,342 A | 4/1951 | Brook et al. ................... 74/55 | | 2,962,012 A | 11/1960 | Howson .................... 123/90.59 |
| 2,563,699 A | 8/1951 | Winter, Jr. ................... 123/55.7 | | 2,963,012 A | 12/1960 | Kolbe ....................... 123/90.33 |
| 2,564,902 A | 8/1951 | Houser et al. ................. 277/437 | | 2,964,027 A | 12/1960 | Dadd ....................... 123/90.35 |
| 2,572,968 A | 10/1951 | Bachle ..................... 123/90.48 | | 2,983,991 A | 5/1961 | Carlson .................... 29/888.43 |
| 2,595,583 A | 5/1952 | Johnson ..................... 123/54.7 | | 2,997,991 A | 8/1961 | Roan ........................ 123/90.16 |
| 2,618,297 A | 11/1952 | Gosselin ................... 123/90.55 | | 3,009,450 A | 11/1961 | Engemann ................ 123/90.43 |
| 2,619,946 A | 12/1952 | Michelich ................. 123/195 R | | 3,016,887 A | 1/1962 | Streit et al. ............... 123/90.27 |
| 2,629,639 A | 2/1953 | Johansen ................... 123/90.49 | | 3,021,593 A | 2/1962 | Cousino ......................... 29/417 |
| 2,631,576 A | 3/1953 | Schowalter ............... 123/90.16 | | 3,021,826 A | 2/1962 | De Feezy et al. ........... 123/90.4 |
| 2,642,051 A | 6/1953 | Russell ......................... 74/519 | | RE25,154 E | 4/1962 | Bergmann ................ 123/90.35 |
| 2,665,669 A | 1/1954 | Ellis ........................ 123/90.55 | | 3,028,479 A | 4/1962 | Tauschek ................. 219/76.15 |
| 2,688,319 A | 9/1954 | Humphreys ............... 123/90.55 | | 3,029,832 A | 4/1962 | Tischler et al. ............. 137/391 |
| 2,694,389 A | 11/1954 | Turkish .................... 123/90.49 | | 3,054,392 A | 9/1962 | Thompson ................ 123/90.35 |
| 2,705,482 A | 4/1955 | Randol .................... 139/196.4 | | 3,070,080 A | 12/1962 | Van Slooten ............ 123/90.59 |
| 2,733,619 A | 2/1956 | Smith ....................... 123/90.49 | | 3,078,194 A | 2/1963 | Thompson ................ 123/90.51 |
| 2,735,313 A | 2/1956 | Dickson ................... 123/90.38 | | 3,079,903 A | 3/1963 | Humphreys ............... 123/90.59 |
| 2,737,934 A | 3/1956 | Banker ........................ 74/569 | | 3,086,507 A | 4/1963 | Mooney, Jr. .............. 123/90.42 |
| 2,739,580 A | 3/1956 | Brown ...................... 123/90.59 | | 3,089,472 A | 5/1963 | Thompson ................. 123/90.5 |
| 2,743,712 A | 5/1956 | Hulsing .................... 123/90.63 | | 3,090,367 A | 5/1963 | Ayres ....................... 123/90.51 |
| 2,743,713 A | 5/1956 | Russell ..................... 123/90.61 | | 3,101,077 A | 8/1963 | Engle ........................ 123/90.5 |
| 2,745,391 A | 5/1956 | Winkler, Jr. ............. 123/90.16 | | 3,101,402 A | 8/1963 | Gondek ....................... 219/107 |
| 2,763,250 A | 9/1956 | Bensinge .................. 123/90.43 | | 3,108,580 A | 10/1963 | Crane, Jr. .................. 123/90.5 |
| 2,765,783 A | 10/1956 | Randol ..................... 123/90.54 | | 3,109,418 A | 11/1963 | Exline et al. ............. 123/90.63 |
| 2,773,761 A | 12/1956 | Fuqua et al. .................. 420/12 | | 3,111,118 A | 11/1963 | Weiman ................... 123/90.53 |
| 2,781,868 A | 2/1957 | House .......................... 188/330 | | 3,111,119 A | 11/1963 | Bergmann ................ 123/90.35 |
| 2,784,707 A | 3/1957 | Skinner .................... 123/90.59 | | 3,114,361 A | 12/1963 | Mullen ..................... 123/188.1 |
| 2,795,217 A | 6/1957 | Ware ........................ 123/90.62 | | 3,124,114 A | 3/1964 | Voorhies ................... 123/90.55 |
| 2,797,673 A | 7/1957 | Black ....................... 123/90.55 | | 3,124,115 A | 3/1964 | Voorhies ................... 123/90.55 |
| 2,797,701 A | 7/1957 | Nurkiewicz ............. 137/243.2 | | 3,128,749 A | 4/1964 | Dadd ....................... 123/90.35 |
| 2,807,251 A | 9/1957 | Peras ....................... 123/90.59 | | 3,137,282 A | 6/1964 | Voorhies ................... 123/90.35 |
| 2,808,818 A | 10/1957 | Sampietro ................ 123/90.43 | | 3,137,283 A | 6/1964 | Sampietro ................ 123/90.43 |
| 2,815,740 A | 12/1957 | Slater ....................... 123/90.55 | | 3,138,146 A | 6/1964 | Hutchison ................ 123/90.39 |
| 2,818,050 A | 12/1957 | Papenguth ............... 123/90.35 | | 3,139,076 A | 6/1964 | Flaherty .................... 123/90.5 |
| 2,818,844 A | 1/1958 | Wood ...................... 123/90.57 | | 3,139,078 A | 6/1964 | Van Slooten ............ 123/90.35 |
| 2,821,970 A | 2/1958 | Line ......................... 123/90.55 | | 3,139,872 A | 7/1964 | Thompson ............... 123/90.41 |
| 2,827,887 A | 3/1958 | Van Slooten ............ 123/90.55 | | 3,144,010 A | 8/1964 | Van Slooten ............ 123/90.35 |
| 2,829,540 A | 4/1958 | Niemeyer ..................... 74/569 | | 3,147,745 A | 9/1964 | Kilgore .................... 123/90.43 |
| 2,840,063 A | 6/1958 | Purchas, Jr. .............. 123/90.55 | | 3,151,603 A | 10/1964 | Schumm ................... 123/90.35 |
| 2,842,111 A | 7/1958 | Braun ..................... 123/188.1 | | 3,153,404 A | 10/1964 | Van Slooten ............ 123/90.43 |
| 2,845,914 A | 8/1958 | Cobo ....................... 123/90.55 | | 3,166,057 A | 1/1965 | Konrad et al. ........... 123/90.16 |
| 2,846,988 A | 8/1958 | Iskenderian ................ 123/90.5 | | 3,169,515 A | 2/1965 | Kilgore et al. ........... 123/90.43 |
| 2,849,997 A | 9/1958 | Kravits ........................ 123/415 | | 3,176,669 A | 4/1965 | Kuchen et al. ........... 123/90.57 |
| 2,853,984 A | 9/1958 | Sampietro ................ 123/90.43 | | 3,177,857 A | 4/1965 | Kuchen et al. ........... 123/90.55 |
| 2,857,895 A | 10/1958 | Scheibe .................... 123/90.35 | | 3,180,328 A | 4/1965 | Engle ........................ 123/90.5 |
| 2,859,510 A | 11/1958 | Baxa ....................... 29/890.051 | | 3,194,439 A | 7/1965 | Beduerftig ..................... 222/66 |
| 2,863,430 A | 12/1958 | Sampietro ................ 123/90.43 | | 3,200,801 A | 8/1965 | Dornbos ................... 123/90.51 |
| 2,863,432 A | 12/1958 | O'Brien .................... 123/90.52 | | 3,220,393 A | 11/1965 | Schlink ....................... 123/527 |
| 2,865,352 A | 12/1958 | Thompson ............... 123/90.35 | | 3,224,243 A | 12/1965 | Van Deberg ................... 72/359 |
| 2,874,685 A | 2/1959 | Line ......................... 123/90.55 | | 3,225,752 A | 12/1965 | Robinson .................... 123/574 |
| 2,875,742 A | 3/1959 | Dolza ......................... 123/481 | | 3,234,815 A | 2/1966 | Line ............................. 74/569 |
| 2,882,876 A | 4/1959 | Bergmann ................ 123/90.35 | | RE25,974 E | 3/1966 | Dadd ....................... 123/90.35 |
| 2,887,098 A | 5/1959 | Thompson ............... 123/90.51 | | 3,240,195 A | 3/1966 | Sossna ..................... 123/90.55 |
| 2,891,525 A | 6/1959 | Moore ...................... 123/90.51 | | 3,255,513 A | 6/1966 | Robinson et al. .............. 419/8 |
| 2,908,260 A | 10/1959 | Bergmann, Sr. ......... 123/90.55 | | 3,267,918 A | 8/1966 | Ayres ....................... 123/90.35 |
| 2,918,047 A | 12/1959 | Mick ....................... 123/198 F | | 3,267,919 A | 8/1966 | Wortman ................. 123/188.11 |
| 2,919,686 A | 1/1960 | Mick ............................ 123/580 | | 3,270,724 A | 9/1966 | Dolza ..................... 123/198 F |
| 2,925,074 A | 2/1960 | Dadd ....................... 123/90.59 | | 3,273,514 A | 9/1966 | Bender ......................... 417/137 |
| 2,925,808 A | 2/1960 | Baumann ................. 123/90.48 | | 3,273,546 A | 9/1966 | Von Arx .................. 123/90.39 |
| 2,926,884 A | 3/1960 | Clinkenbeard .............. 251/210 | | 3,273,547 A | 9/1966 | Lesher ..................... 123/90.35 |
| 2,932,290 A | 4/1960 | Christensen .............. 123/90.51 | | 3,273,548 A | 9/1966 | Hoffman .................. 123/90.43 |
| 2,934,051 A | 4/1960 | Drew ....................... 123/90.43 | | 3,273,998 A | 9/1966 | Knoth et al. .................. 420/17 |
| 2,934,052 A | 4/1960 | Longenecker ........... 123/90.16 | | 3,277,874 A | 10/1966 | Wagner ................... 123/90.16 |
| 2,935,059 A | 5/1960 | Thompson ............... 123/90.51 | | 3,280,806 A | 10/1966 | Iskenderian ............. 123/90.47 |
| 2,935,878 A | 5/1960 | Wirsching ..................... 74/55 | | 3,280,807 A | 10/1966 | Bardy ..................... 123/90.35 |
| 2,937,632 A | 5/1960 | Voorhies ................... 123/90.36 | | 3,291,107 A | 12/1966 | Cornell .................... 123/90.51 |

| | | | | | | | |
|---|---|---|---|---|---|---|---|
| 3,299,869 A | 1/1967 | Sicklesteel | 123/90.27 | 3,855,981 A | 12/1974 | Loon | 123/90.27 |
| 3,299,966 A | 1/1967 | Briggs et al. | 184/6.9 | 3,859,969 A | 1/1975 | Davis, Jr. | 123/90.61 |
| 3,301,239 A | 1/1967 | Thauer | 123/90.52 | 3,860,457 A | 1/1975 | Vourinen et al. | 148/614 |
| 3,301,241 A | 1/1967 | Iskenderian | 123/90.5 | 3,870,024 A | 3/1975 | Ridgeway | 123/90.41 |
| 3,303,833 A | 2/1967 | Melling | 123/90.48 | 3,875,908 A | 4/1975 | Ayres | 123/90.36 |
| 3,304,925 A | 2/1967 | Rhoads | 123/90.55 | 3,875,911 A | 4/1975 | Joseph | 123/90.55 |
| 3,314,303 A | 4/1967 | Maat | 74/569 | 3,877,445 A | 4/1975 | Barnes | 123/90.35 |
| 3,314,404 A | 4/1967 | Thompson | 123/90.43 | 3,877,446 A | 4/1975 | Morgan | 123/90.55 |
| 3,322,104 A | 5/1967 | Abell, Jr. | 123/90.55 | 3,879,023 A | 4/1975 | Pearce et al. | 267/64.11 |
| 3,332,405 A | 7/1967 | Haviland | 123/321 | 3,880,127 A | 4/1975 | Abell, Jr. | 123/90.35 |
| 3,354,898 A | 11/1967 | Barnes | 137/331 | 3,886,808 A | 6/1975 | Weber | 74/569 |
| 3,365,979 A | 1/1968 | Ericson | 74/569 | 3,893,873 A | 7/1975 | Hanai et al. | 148/614 |
| 3,367,312 A | 2/1968 | Jonsson | 123/321 | 3,902,467 A | 9/1975 | Cornell | 123/90.35 |
| 3,379,180 A | 4/1968 | Kabel et al. | 123/90.35 | 3,911,879 A | 10/1975 | Altmann | 123/90.16 |
| 3,385,274 A | 5/1968 | Shunta et al. | 123/90.16 | 3,915,129 A | 10/1975 | Rust et al. | 123/90.18 |
| 3,400,696 A | 9/1968 | Thompson | 123/90.27 | 3,921,609 A | 11/1975 | Rhoads | 123/90.55 |
| 3,405,699 A | 10/1968 | Laas | 123/320 | 3,945,367 A | 3/1976 | Turner, Jr. | 123/198 F |
| 3,410,366 A | 11/1968 | Winter, Jr. | 184/6.9 | 3,958,900 A | 5/1976 | Ueno | 417/237 |
| 3,413,965 A | 12/1968 | Gavasso | 123/90.16 | 3,964,455 A | 6/1976 | Brown | 123/90.43 |
| 3,422,803 A | 1/1969 | Stivender | 123/90.16 | 3,967,602 A | 7/1976 | Brown | 123/90.55 |
| 3,426,651 A | 2/1969 | Arendarski | 92/26 | 3,977,370 A | 8/1976 | Humphreys | 123/90.5 |
| 3,430,613 A | 3/1969 | Barnes | 123/90.35 | 3,992,663 A | 11/1976 | Seddick | 324/529 |
| 3,437,080 A | 4/1969 | Abell, Jr. | 123/90.35 | 3,998,190 A | 12/1976 | Keske | 123/90.5 |
| 3,439,659 A | 4/1969 | Bouwkamp | 123/90.35 | 4,004,558 A | 1/1977 | Scheibe | 123/90.35 |
| 3,439,660 A | 4/1969 | Lesher | 123/90.35 | 4,007,716 A | 2/1977 | Jones | 123/90.28 |
| 3,439,662 A | 4/1969 | Jones et al. | 123/321 | 4,009,695 A | 3/1977 | Ule | 123/90.13 |
| 3,448,730 A | 6/1969 | Abell, Jr. | 123/90.35 | 4,009,696 A | 3/1977 | Cornell | 123/90.35 |
| 3,450,228 A | 6/1969 | Wortman et al. | 184/6.9 | 4,050,435 A | 9/1977 | Fuller, Jr. et al. | 123/198 F |
| 3,455,346 A | 7/1969 | Sven-Torsten Stork | 141/42 | 4,061,123 A | 12/1977 | Janes | 123/198 F |
| 3,463,131 A | 8/1969 | Dolby | 123/90.25 | 4,064,844 A | 12/1977 | Matsumoto et al. | 123/481 |
| 3,470,857 A | 10/1969 | Stivender | 123/346 | 4,064,861 A | 12/1977 | Schulz | 123/198 F |
| 3,470,983 A | 10/1969 | Briggs | 184/6.9 | 4,080,941 A | 3/1978 | Bertrand | 123/568.32 |
| 3,476,093 A | 11/1969 | Line | 123/90.35 | 4,086,887 A | 5/1978 | Schoonover et al. | 123/90.39 |
| 3,490,423 A | 1/1970 | Shunta et al. | 123/90.16 | 4,089,234 A | 5/1978 | Henson et al. | 74/569 |
| 3,502,058 A | 3/1970 | Thompson | 123/90.34 | 4,094,279 A | 6/1978 | Kueny | 123/90.51 |
| 3,518,976 A | 7/1970 | Thuesen | 123/90.16 | 4,098,240 A | 7/1978 | Abell, Jr. | 123/90.55 |
| 3,520,287 A | 7/1970 | Calvin | 123/321 | 4,104,991 A | 8/1978 | Abdoo | 123/198 F |
| 3,521,633 A | 7/1970 | Yahner | 604/71 | 4,104,996 A | 8/1978 | Hosono et al. | 123/90.43 |
| 3,523,459 A | 8/1970 | Mowbray | 74/55 | 4,105,267 A | 8/1978 | Mori | 384/291 |
| 3,528,451 A | 9/1970 | Hansen | 137/433 | 4,107,921 A | 8/1978 | Iizuka | 60/288 |
| 3,542,001 A | 11/1970 | Line | 123/90.43 | 4,114,588 A | 9/1978 | Jordan | 123/198 F |
| 3,547,087 A | 12/1970 | Siegler | 123/321 | 4,114,643 A | 9/1978 | Aoyama et al. | 137/495 |
| 3,549,430 A | 12/1970 | Kies et | 420/17 | 4,133,332 A | 1/1979 | Benson et al. | 123/198 F |
| 3,549,431 A | 12/1970 | Gäetan de Coye de Ca | 148/116 | 4,141,333 A | 2/1979 | Gilbert | 123/198 F |
| | | | | 4,151,817 A | 5/1979 | Mueller | 123/90.16 |
| 3,572,300 A | 3/1971 | Stager et al. | 123/321 | 4,152,953 A | 5/1979 | Headley | 74/569 |
| 3,587,539 A | 6/1971 | Morris V. Dadd | 123/90.35 | 4,164,917 A | 8/1979 | Glasson | 123/321 |
| 3,590,796 A | 7/1971 | Harkness | 123/182.1 | 4,167,931 A | 9/1979 | Iizuka | 123/198 F |
| 3,598,095 A | 8/1971 | Ayres | 123/90.35 | 4,173,209 A | 11/1979 | Jordan | 113/198 F |
| 3,630,179 A | 12/1971 | Dadd | 123/90.35 | 4,173,954 A | 11/1979 | Speckhart | 123/90.5 |
| 3,633,555 A | 1/1972 | Raggi | 123/90.17 | 4,175,534 A | 11/1979 | Jordan | 123/198 F |
| 3,641,988 A | 2/1972 | Torazza et al. | 123/90.16 | 4,184,464 A | 1/1980 | Svihlik | 123/90.55 |
| 3,650,251 A | 3/1972 | Pelizzoni | 123/90.57 | 4,188,933 A | 2/1980 | Iizuka | 123/198 F |
| 3,662,725 A | 5/1972 | Dragon et al. | 123/518 | 4,191,142 A | 3/1980 | Kodama | 123/90.58 |
| 3,664,312 A | 5/1972 | Miller, Jr. | 123/90.19 | 4,192,263 A | 3/1980 | Kitagawa et al. | 123/90.39 |
| 3,665,156 A | 5/1972 | Lee | 392/451 | 4,200,081 A | 4/1980 | Meyer et al. | 123/198 F |
| 3,668,945 A | 6/1972 | Hofmann | 74/569 | 4,203,397 A | 5/1980 | Soeters, Jr. | 123/90.16 |
| 3,690,959 A | 9/1972 | Thompson | 148/542 | 4,204,814 A | 5/1980 | Matzen | 417/437 |
| 3,716,036 A | 2/1973 | Kruger | 123/90.43 | 4,206,734 A | 6/1980 | Perr et al. | 123/502 |
| 3,717,134 A | 2/1973 | Cornell | 123/90.35 | 4,207,775 A | 6/1980 | Lintott | 74/551 |
| 3,722,484 A | 3/1973 | Gordini | 123/90.27 | 4,213,442 A | 7/1980 | Mihalic | 123/198 F |
| 3,741,240 A | 6/1973 | Berriman | 137/483 | 4,221,199 A | 9/1980 | Buuck et al. | 123/90.16 |
| 3,742,921 A | 7/1973 | Rendine | 123/90.16 | 4,221,200 A | 9/1980 | Soeters, Jr. | 123/90.16 |
| 3,782,345 A | 1/1974 | Erickson et al. | 123/90.35 | 4,221,201 A | 9/1980 | Soeters, Jr. | 123/90.16 |
| 3,786,792 A | 1/1974 | Pelizzoni et al. | 123/321 | 4,222,354 A | 9/1980 | Uitvlugt | 123/90.15 |
| 3,795,229 A | 3/1974 | Weber | 123/90.5 | 4,222,793 A | 9/1980 | Grindahl | 148/544 |
| 3,799,129 A | 3/1974 | Cornell | 123/90.36 | 4,227,149 A | 10/1980 | Faure et al. | 324/754 |
| 3,799,186 A | 3/1974 | Bulin | 137/204 | 4,227,494 A | 10/1980 | Uitvlugt | 123/90.16 |
| 3,805,753 A | 4/1974 | Bergmann et al. | 123/90.6 | 4,227,495 A | 10/1980 | Krieg | 123/90.55 |
| 3,822,683 A | 7/1974 | Clouse | 123/90.5 | 4,228,771 A | 10/1980 | Krieg | 123/90.55 |
| 3,831,457 A | 8/1974 | Kern | 74/569 | 4,230,076 A | 10/1980 | Mueller | 123/90.16 |
| 3,838,669 A | 10/1974 | Dadd | 123/90.35 | 4,231,267 A | 11/1980 | Van Slooten | 74/569 |
| 3,848,188 A | 11/1974 | Ardezzone et al. | 714/744 | 4,237,832 A | 12/1980 | Hartig et al. | 123/58.8 |

| | | | | | | | |
|---|---|---|---|---|---|---|---|
| 4,245,596 A | 1/1981 | Bruder et al. | 123/198 F | 4,524,731 A | 6/1985 | Rhoads | 123/90.57 |
| 4,249,488 A | 2/1981 | Siegla | 123/90.16 | 4,526,142 A | 7/1985 | Hara et al. | 123/90.16 |
| 4,249,489 A | 2/1981 | Bruder et al. | 123/90.16 | 4,534,323 A | 8/1985 | Kato et al. | 123/90.16 |
| 4,252,093 A | 2/1981 | Hazelrigg | 123/198 F | 4,535,732 A | 8/1985 | Nakano et al. | 123/90.16 |
| 4,256,070 A | 3/1981 | Mueller | 123/198 F | 4,537,164 A | 8/1985 | Ajiki et al. | 123/90.16 |
| 4,258,671 A | 3/1981 | Takizawa et al. | 123/90.16 | 4,537,165 A | 8/1985 | Honda et al. | 123/90.16 |
| 4,258,673 A | 3/1981 | Stoody, Jr. et al. | 123/90.34 | 4,539,951 A | 9/1985 | Hara et al. | 123/90.17 |
| 4,262,640 A | 4/1981 | Clark | 123/198 F | 4,541,878 A | 9/1985 | Mühlberger et al. | 148/614 |
| 4,284,042 A | 8/1981 | Springer | 123/198 F | 4,545,342 A | 10/1985 | Nakano et al. | 123/198 F |
| 4,285,310 A | 8/1981 | Takizawa et al. | 123/308 | 4,546,734 A | 10/1985 | Kodama | 123/90.16 |
| 4,305,356 A | 12/1981 | Walsh | 123/198 F | 4,549,509 A | 10/1985 | Burtchell | 123/9.16 |
| 4,317,433 A * | 3/1982 | Fuhrmann | 123/90.51 | 4,556,025 A | 12/1985 | Morita | 123/198 F |
| 4,325,589 A | 4/1982 | Hirt | 384/375 | 4,559,909 A | 12/1985 | Honda et al. | 123/90.28 |
| 4,326,484 A | 4/1982 | Amrhein | 123/90.5 | 4,561,393 A | 12/1985 | Kopel | 123/90.48 |
| 4,335,685 A | 6/1982 | Clouse | 123/90.5 | 4,567,861 A | 2/1986 | Hara et al. | 123/90.16 |
| 4,336,775 A | 6/1982 | Meyer | 123/198 F | 4,570,582 A | 2/1986 | Speil | 123/90.46 |
| 4,337,738 A | 7/1982 | Bubniak et al. | 123/198 F | 4,576,128 A | 3/1986 | Kenichi | 123/198 F |
| 4,338,894 A | 7/1982 | Kodama | 123/90.58 | 4,579,094 A | 4/1986 | Döppling et al. | 123/90.55 |
| 4,356,799 A | 11/1982 | Clark | 123/90.65 | 4,584,974 A | 4/1986 | Aoyama et al. | 123/90.16 |
| 4,361,120 A | 11/1982 | Kueny | 123/90.55 | 4,584,976 A | 4/1986 | Hillebrand | 123/90.55 |
| 4,362,991 A | 12/1982 | Carbine | 324/754 | 4,587,936 A | 5/1986 | Matsuura et al. | 123/315 |
| 4,363,300 A | 12/1982 | Honda | 123/315 | 4,589,383 A | 5/1986 | Showalter | 123/90.36 |
| 4,367,701 A | 1/1983 | Buente | 123/90.55 | 4,589,387 A | 5/1986 | Miura et al. | 123/198 F |
| 4,369,627 A | 1/1983 | Kasting et al. | 60/605.1 | 4,590,898 A | 5/1986 | Buente et al. | 123/90.55 |
| 4,380,219 A | 4/1983 | Walsh | 123/198 F | RE32,167 E | 6/1986 | Buente | 123/90.55 |
| 4,385,599 A | 5/1983 | Hori et al. | 123/90.58 | 4,596,213 A | 6/1986 | Hillebrand | 123/90.55 |
| 4,387,674 A | 6/1983 | Connell | 123/90.16 | 4,602,409 A | 7/1986 | Schaeffler | 29/888.41 |
| 4,387,675 A | 6/1983 | Hori et al. | 123/90.58 | 4,607,599 A | 8/1986 | Buente et al. | 123/90.5 |
| 4,387,680 A | 6/1983 | Tsunetomi et al. | 123/198 F | 4,611,558 A | 9/1986 | Yoshizaki et al. | 123/90.16 |
| 4,397,270 A | 8/1983 | Aoyama | 127/90.16 | 4,612,884 A | 9/1986 | Ajiki et al. | 123/90.16 |
| 4,401,064 A | 8/1983 | Nakamura et al. | 123/90.39 | 4,614,171 A | 9/1986 | Malhotra | 123/90.44 |
| 4,402,285 A | 9/1983 | Arai et al. | 123/90.58 | 4,615,306 A | 10/1986 | Wakeman | 123/90.16 |
| 4,406,257 A | 9/1983 | Keske et al. | 123/90.48 | 4,615,307 A | 10/1986 | Kodam et al. | 123/90.16 |
| 4,408,580 A | 10/1983 | Kosuda et al. | 123/90.16 | 4,624,223 A | 11/1986 | Wherry et al. | 123/90.44 |
| 4,411,229 A | 10/1983 | Curtis et al. | 123/198 F | 4,628,874 A | 12/1986 | Barlow | 123/90.5 |
| 4,414,935 A | 11/1983 | Curtis et al. | 123/198 F | 4,633,827 A | 1/1987 | Buente | 123/90.55 |
| 4,437,439 A | 3/1984 | Speil | 123/90.56 | 4,635,593 A | 1/1987 | Kodama | 123/90.55 |
| 4,437,738 A | 3/1984 | Headley et al. | 353/26 R | 4,637,357 A | 1/1987 | Ohmi | 123/90.48 |
| 4,438,736 A | 3/1984 | Hara et al. | 123/90.16 | 4,638,773 A | 1/1987 | Bonvallet | 123/90.16 |
| 4,440,121 A | 4/1984 | Clancy et al. | 123/90.39 | 4,643,141 A | 2/1987 | Bledsoe | 123/90.16 |
| 4,442,806 A | 4/1984 | Matsuura et al. | 123/198 F | 4,648,360 A | 3/1987 | Schaeffler | 123/90.55 |
| 4,448,155 A | 5/1984 | Hillebrand et al. | 123/90.5 | 4,653,441 A | 3/1987 | Belsanti | 123/90.39 |
| 4,448,156 A | 5/1984 | Henault | 123/90.17 | 4,655,176 A | 4/1987 | Sheehan | 123/90.16 |
| 4,452,187 A | 6/1984 | Kosuda et al. | 123/90.16 | 4,656,977 A | 4/1987 | Nagahiro et al. | 123/90.16 |
| 4,453,505 A * | 6/1984 | Holtzberg et al. | 123/90.61 | 4,671,221 A | 6/1987 | Geringer et al. | 123/90.16 |
| 4,457,270 A | 7/1984 | Kodama et al. | 123/90.58 | 4,674,451 A | 6/1987 | Rembold et al. | 123/90.16 |
| 4,459,946 A | 7/1984 | Burandt | 123/90.16 | 4,677,723 A | 7/1987 | Greene, Sr. | 29/890.121 |
| 4,462,353 A | 7/1984 | Arai et al. | 123/198 F | 4,690,110 A | 9/1987 | Nishimura et al. | 123/90.17 |
| 4,462,364 A | 7/1984 | Kodama | 123/90.55 | 4,693,214 A | 9/1987 | Titolo | 123/90.18 |
| 4,463,714 A | 8/1984 | Nakamura | 123/90.57 | 4,694,788 A | 9/1987 | Craig | 123/90.16 |
| 4,465,038 A | 8/1984 | Speil | 123/90.55 | 4,696,265 A | 9/1987 | Nohira | 123/90.16 |
| 4,466,390 A | 8/1984 | Babitzka et al. | 123/90.16 | 4,697,473 A | 10/1987 | Patel | 74/579 |
| 4,469,061 A | 9/1984 | Ajiki et al. | 123/198 F | 4,699,094 A | 10/1987 | Stegeman | 123/90.46 |
| 4,475,489 A | 10/1984 | Honda | 123/90.16 | 4,704,995 A | 11/1987 | Soeters, Jr. | 123/90.5 |
| 4,475,497 A | 10/1984 | Honda et al. | 123/198 F | 4,708,102 A | 11/1987 | Schmid | 123/90.35 |
| 4,480,617 A | 11/1984 | Nakano et al. | 123/432 | 4,711,202 A | 12/1987 | Baker | 123/90.26 |
| 4,481,913 A | 11/1984 | Wirth | 123/90.35 | 4,711,207 A | 12/1987 | Bonvallet | 123/198 F |
| 4,481,919 A | 11/1984 | Honda et al. | 123/198 F | 4,716,863 A | 1/1988 | Pruzan | 123/90.15 |
| 4,483,281 A | 11/1984 | Black | 123/90.55 | 4,718,379 A | 1/1988 | Clark | 123/90.39 |
| 4,484,546 A | 11/1984 | Burandt | 123/90.15 | 4,724,802 A | 2/1988 | Ishii | 123/90.16 |
| 4,488,520 A | 12/1984 | Almor | 123/90.39 | 4,724,804 A | 2/1988 | Wirth | 123/90.39 |
| 4,498,432 A | 2/1985 | Hara et al. | 123/90.16 | 4,724,822 A | 2/1988 | Bonvallet | 123/90.16 |
| 4,499,870 A | 2/1985 | Aoyama | 123/198 F | 4,726,332 A | 2/1988 | Nishimura et al. | 123/90.16 |
| 4,502,425 A | 3/1985 | Wride | 123/90.12 | 4,727,830 A | 3/1988 | Nagahiro et al. | 123/90.16 |
| 4,502,428 A | 3/1985 | Paar | 123/90.16 | 4,727,831 A | 3/1988 | Nagahiro et al. | 123/90.16 |
| 4,503,818 A | 3/1985 | Hara et al. | 123/90.16 | 4,738,231 A | 4/1988 | Patel et al. | 123/90.44 |
| 4,506,635 A | 3/1985 | van Rinsum | 123/90.22 | 4,741,297 A | 5/1988 | Nagahiro et al. | 123/90.16 |
| 4,509,467 A | 4/1985 | Arai et al. | 123/90.16 | 4,741,298 A | 5/1988 | Rhoads | 123/90.5 |
| 4,515,121 A | 5/1985 | Matsuura et al. | 123/198 F | 4,745,888 A | 5/1988 | Kapp | 123/90.33 |
| 4,515,346 A | 5/1985 | Gaterman, III | 251/337 | 4,747,376 A | 5/1988 | Speil et al. | 123/90.55 |
| 4,517,936 A | 5/1985 | Burgio di Aragona | 123/90.5 | 4,756,282 A | 7/1988 | Kunz et al. | 123/90.55 |
| 4,519,345 A | 5/1985 | Walter | 123/90.16 | 4,759,321 A | 7/1988 | Matsumoto et al. | 123/90.15 |
| 4,523,550 A | 6/1985 | Honda et al. | 123/90.16 | 4,759,322 A | 7/1988 | Konno | 123/90.16 |

| | | | | | | | |
|---|---|---|---|---|---|---|---|
| 4,762,096 A | 8/1988 | Kamm et al. | 123/90.16 | 5,010,857 A | 4/1991 | Hempelmann et al. | 123/90.39 |
| 4,765,288 A | 8/1988 | Linder et al. | 123/90.16 | 5,018,487 A | 5/1991 | Shinkai | 123/90.16 |
| 4,765,289 A | 8/1988 | Masuda et al. | 123/90.16 | 5,022,356 A | 6/1991 | Morel, Jr. et al. | 123/90.5 |
| 4,768,467 A | 9/1988 | Yamada et al. | 123/90.16 | 5,025,761 A | 6/1991 | Chen | 123/90.16 |
| 4,768,475 A | 9/1988 | Ikemura | 123/90.16 | 5,028,281 A | 7/1991 | Hayes et al. | 148/321 |
| 4,771,741 A | 9/1988 | Leer | 123/90.5 | 5,033,420 A | 7/1991 | Mayayoshi et al. | 123/90.16 |
| 4,771,742 A | 9/1988 | Nelson et al. | 123/90.17 | 5,036,807 A | 8/1991 | Kaneko | 123/90.16 |
| 4,773,359 A | 9/1988 | Titolo | 123/90.22 | 5,040,651 A | 8/1991 | Hampton et al. | 192/45.1 |
| 4,779,583 A | 10/1988 | Laffter et al. | 123/90.58 | 5,042,436 A | 8/1991 | Yamamoto et al. | 123/90.15 |
| 4,779,589 A | 10/1988 | Matsuura et al. | 123/315 | 5,042,437 A | 8/1991 | Sakuragi et al. | 123/90.16 |
| 4,782,799 A | 11/1988 | Goppelt et al. | 123/90.55 | 5,046,462 A | 9/1991 | Matayoshi et al. | 123/90.16 |
| 4,784,095 A | 11/1988 | Golding et al. | 123/90.41 | 5,048,475 A | 9/1991 | Mills | 123/90.39 |
| 4,787,347 A | 11/1988 | Schaeffler | 123/90.55 | 5,069,173 A | 12/1991 | Mallas | 123/90.61 |
| 4,790,274 A | 12/1988 | Inoue et al. | 123/198 F | 5,070,827 A | 12/1991 | Krieg et al. | 123/90.48 |
| 4,791,895 A | 12/1988 | Tittizer | 123/90.12 | 5,074,260 A | 12/1991 | Yagi et al. | 123/90.16 |
| 4,793,295 A | 12/1988 | Downing | 123/90.5 | 5,074,261 A | 12/1991 | Hamburg et al. | 123/90.39 |
| 4,793,296 A | 12/1988 | Inoue et al. | 123/90.16 | 5,080,053 A | 1/1992 | Parsons | 123/90.15 |
| 4,796,483 A | 1/1989 | Patel et al. | 74/519 | 5,088,455 A | 2/1992 | Moretz | 123/90.5 |
| 4,796,573 A | 1/1989 | Wakeman et al. | 123/90.16 | 5,090,364 A | 2/1992 | McCarroll et al. | 123/90.16 |
| 4,799,463 A | 1/1989 | Konno | 123/90.17 | 5,099,806 A | 3/1992 | Murata et al. | 123/90.16 |
| 4,800,850 A | 1/1989 | Yoshida et al. | 123/90.16 | 5,099,807 A | 3/1992 | Devine | 123/90.48 |
| 4,802,448 A | 2/1989 | Ableitner | 123/90.55 | 5,107,806 A | 4/1992 | Döhring et al. | 123/90.55 |
| 4,803,334 A | 2/1989 | Burke et al. | 219/121.64 | 5,113,813 A | 5/1992 | Rosa | 123/90.16 |
| 4,805,567 A | 2/1989 | Heimburg | 123/90.22 | RE33,967 E | 6/1992 | Honda et al. | 123/90.16 |
| 4,809,651 A | 3/1989 | Gerchow et al. | 123/90.5 | 5,119,774 A | 6/1992 | Krieg et al. | 123/90.55 |
| 4,815,424 A | 3/1989 | Buuck et al. | 123/90.46 | 5,127,374 A | 7/1992 | Morel, Jr. et al. | 123/90.35 |
| 4,825,717 A | 5/1989 | Mills | 74/519 | 5,129,373 A | 7/1992 | Cuatt et al. | 123/90.55 |
| 4,825,823 A | 5/1989 | Schaeffler | 123/90.55 | 5,148,783 A | 9/1992 | Shinkai et al. | 123/90.16 |
| 4,829,948 A | 5/1989 | Yoshida et al. | 123/90.16 | 5,150,672 A | 9/1992 | Fischer et al. | 123/90.22 |
| 4,840,153 A | 6/1989 | Aida et al. | 123/90.55 | 5,161,493 A | 11/1992 | Ma | 123/90.17 |
| 4,844,022 A | 7/1989 | Konno | 123/90.16 | 5,163,389 A | 11/1992 | Fujikawa et al. | 123/90.16 |
| 4,844,023 A | 7/1989 | Konno et al. | 123/90.16 | 5,178,107 A | 1/1993 | Morel, Jr. et al. | 123/90.35 |
| 4,848,180 A | 7/1989 | Mills | 74/519 | 5,181,485 A | 1/1993 | Hirose et al. | 123/90.17 |
| 4,848,285 A | 7/1989 | Konno | 123/90.16 | 5,184,581 A | 2/1993 | Aoyama et al. | 123/90.31 |
| 4,850,311 A | 7/1989 | Shon | 123/90.18 | 5,186,130 A | 2/1993 | Melchior | 123/90.35 |
| 4,858,574 A | 8/1989 | Fukuo et al. | 123/90.34 | 5,188,067 A | 2/1993 | Fontichiaro et al. | 123/90.18 |
| 4,867,114 A | 9/1989 | Schaeffler | 427/561 | 5,188,068 A | 2/1993 | Gaterman, III et al. | 123/90.35 |
| 4,869,214 A | 9/1989 | Inoue et al. | 123/90.16 | 5,189,997 A | 3/1993 | Schneider | 123/90.16 |
| 4,872,429 A | 10/1989 | Anderson et al. | 123/90.44 | 5,193,496 A | 3/1993 | Kruger | 123/90.16 |
| 4,876,944 A | 10/1989 | Wilson et al. | 91/35 | 5,199,393 A | 4/1993 | Baldassini | 123/90.17 |
| 4,876,994 A | 10/1989 | Speil et al. | 123/90.5 | 5,239,951 A | 8/1993 | Rao et al. | 123/90.5 |
| 4,876,997 A | 10/1989 | Zorn et al. | 123/90.52 | 5,247,913 A | 9/1993 | Manolis | 123/90.16 |
| 4,883,027 A | 11/1989 | Oikawa et al. | 123/90.16 | 5,253,621 A | 10/1993 | Dopson et al. | 123/90.16 |
| 4,887,561 A | 12/1989 | Kishi | 123/90.16 | 5,259,346 A | 11/1993 | Mills | 123/90.39 |
| 4,887,563 A | 12/1989 | Ishida et al. | 123/90.16 | 5,261,361 A | 11/1993 | Speil | 123/90.22 |
| 4,887,566 A | 12/1989 | Shida | 123/90.51 | 5,263,386 A | 11/1993 | Campbell et al. | 74/569 |
| 4,896,635 A | 1/1990 | Willermet et al. | 123/90.36 | 5,273,005 A | 12/1993 | Philo et al. | 123/90.5 |
| 4,899,701 A | 2/1990 | Inoue et al. | 123/90.16 | 5,287,830 A | 2/1994 | Dopson et al. | 123/90.16 |
| 4,905,639 A | 3/1990 | Konno | 123/90.16 | 5,301,636 A | 4/1994 | Nakamura | 123/90.16 |
| 4,909,195 A | 3/1990 | Hasebe et al. | 123/90.16 | 5,307,769 A | 5/1994 | Meagher et al. | 123/90.5 |
| 4,909,197 A | 3/1990 | Perr | 123/90.48 | 5,320,082 A | 6/1994 | Murata et al. | 123/90.16 |
| 4,917,056 A | 4/1990 | Yagi et al. | 123/90.16 | 5,343,833 A | 9/1994 | Shirai | 123/90.16 |
| 4,917,059 A | 4/1990 | Umeda | 123/90.55 | 5,345,898 A | 9/1994 | Krebs | 123/90.17 |
| 4,919,089 A | 4/1990 | Fujiyoshi et al. | 123/90.16 | 5,347,965 A | 9/1994 | Decuir | 123/90.61 |
| 4,920,935 A | 5/1990 | Shida | 123/90.51 | 5,351,662 A | 10/1994 | Dopson et al. | 123/90.16 |
| 4,921,064 A | 5/1990 | Wazaki et al. | 180/197 | 5,353,756 A | 10/1994 | Murata et al. | 123/90.16 |
| 4,924,821 A | 5/1990 | Teerman | 123/90.22 | 5,357,916 A | 10/1994 | Matterazzo | 123/90.16 |
| 4,926,804 A | 5/1990 | Fukuo | 123/90.16 | 5,361,733 A | 11/1994 | Spath et al. | 123/90.16 |
| 4,930,465 A | 6/1990 | Wakeman et al. | 123/90.12 | 5,365,896 A | 11/1994 | Hara et al. | 123/90.17 |
| 4,940,048 A | 7/1990 | Mills | 123/90.39 | 5,379,730 A | 1/1995 | Schaeffler | 123/90.55 |
| 4,944,257 A | 7/1990 | Mills | 123/90.39 | 5,385,124 A | 1/1995 | Hillebrand et al. | 123/90.5 |
| 4,951,619 A | 8/1990 | Schaeffler | 123/90.55 | 5,386,806 A | 2/1995 | Allen et al. | 123/90.16 |
| 4,957,076 A | 9/1990 | Inoue et al. | 123/90.16 | 5,394,843 A | 3/1995 | Decuir | 123/90.39 |
| 4,959,794 A | 9/1990 | Shiraishi et al. | 701/92 | 5,398,648 A | 3/1995 | Spath et al. | 123/90.16 |
| RE33,411 E | 10/1990 | Inoue et al. | 123/198 F | 5,402,756 A | 4/1995 | Bohme et al. | 123/90.16 |
| 4,969,102 A | 11/1990 | Tamura et al. | 701/85 | 5,419,290 A | 5/1995 | Hurr et al. | 123/90.16 |
| 4,971,164 A | 11/1990 | Fujita et al. | 180/197 | 5,429,079 A | 7/1995 | Murata et al. | 123/90.16 |
| 4,986,166 A * | 1/1991 | Shida | 95/52 | 5,430,934 A | 7/1995 | Groh et al. | 29/788.43 |
| 4,986,227 A | 1/1991 | Dewey, III | 123/90.16 | 5,431,133 A | 7/1995 | Spath et al. | 123/90.16 |
| 4,993,150 A | 2/1991 | Reinhardt et al. | 21/888.43 | 5,454,353 A | 10/1995 | Elendt et al. | 123/90.16 |
| 4,995,281 A | 2/1991 | Allor et al. | 74/559 | 5,501,186 A | 3/1996 | Hara et al. | 123/90.13 |
| 5,003,939 A | 4/1991 | King | 123/90.16 | 5,509,385 A | 4/1996 | LaVieri | 123/90.35 |
| 5,010,856 A | 4/1991 | Ojala | 123/90.36 | 5,520,144 A | 5/1996 | Philo et al. | 123/90.5 |

| | | | | |
|---|---|---|---|---|
| 5,544,626 A | 8/1996 | Diggs et al. | ............. | 123/90.16 |
| 5,546,899 A | 8/1996 | Sperling et al. | ............ | 123/90.5 |
| 5,549,081 A | 8/1996 | Ohlendorf et al. | ........ | 123/90.16 |
| 5,553,584 A | 9/1996 | Konno | .................... | 123/90.16 |
| 5,555,861 A | 9/1996 | Mayr et al. | ............... | 123/90.16 |
| 5,560,265 A | 10/1996 | Miller | ........................ | 74/559 |
| 5,560,329 A | 10/1996 | Hayman | .................. | 123/90.31 |
| 5,566,652 A | 10/1996 | Deppe | .................... | 123/90.35 |
| 5,584,268 A | 12/1996 | Natkin et al. | ............ | 123/90.46 |
| 5,592,907 A | 1/1997 | Hasebe et al. | ........... | 123/90.16 |
| 5,603,294 A | 2/1997 | Kawai | .................... | 123/90.16 |
| 5,613,469 A | 3/1997 | Rygiel | ..................... | 123/90.16 |
| 5,642,694 A | 7/1997 | Dura et al. | ............. | 123/90.43 |
| 5,651,335 A | 7/1997 | Elendt et al. | ............ | 123/90.16 |
| 5,653,198 A | 8/1997 | Diggs | ..................... | 123/90.16 |
| 5,655,487 A | 8/1997 | Maas et al. | ............. | 123/90.16 |
| 5,655,488 A | 8/1997 | Hampton et al. | ........ | 123/90.16 |
| 5,660,153 A | 8/1997 | Hampton et al. | ........ | 123/90.16 |
| 5,673,661 A | 10/1997 | Jesel | ....................... | 123/90.48 |
| 5,678,514 A | 10/1997 | Mazzella et al. | .......... | 123/90.5 |
| 5,697,333 A | 12/1997 | Church et al. | ........... | 123/90.16 |
| 5,706,773 A | 1/1998 | Dura et al. | ............. | 123/90.51 |
| 5,746,165 A | 5/1998 | Speil et al. | .............. | 123/90.16 |
| 5,758,415 A * | 6/1998 | Hara | ...................... | 29/888.43 |
| 5,775,275 A | 7/1998 | Philio | ........................ | 123/90.5 |
| 5,797,364 A | 8/1998 | Meek et al. | ............. | 123/90.36 |
| 5,806,475 A | 9/1998 | Hausknecht | ............. | 123/90.16 |
| 5,875,748 A | 3/1999 | Haas et al. | .............. | 123/90.16 |
| 5,893,344 A | 4/1999 | Church | .................... | 123/90.16 |
| 5,901,676 A * | 5/1999 | Edelmayer | ............... | 123/90.35 |
| 5,908,015 A | 6/1999 | Kreuter | ................... | 123/90.16 |
| 5,924,396 A | 7/1999 | Ochiai et al. | ............ | 123/90.16 |
| 5,934,232 A | 8/1999 | Greene et al. | ........... | 123/90.16 |
| 5,954,020 A * | 9/1999 | Schmidt et al. | .......... | 123/90.48 |
| 5,960,756 A | 10/1999 | Miyachi et al. | .......... | 123/90.16 |
| 5,983,848 A | 11/1999 | Calka | ...................... | 123/90.42 |
| 6,006,706 A | 12/1999 | Kanzaki | .................. | 123/90.15 |
| 6,032,624 A | 3/2000 | Tsuruta et al. | ........... | 123/90.16 |
| 6,058,895 A | 5/2000 | Hermsen | ................. | 123/90.16 |
| 6,092,497 A | 7/2000 | Preston et al. | ........... | 123/90.16 |
| 6,186,101 B1 | 2/2001 | Kreuter | ................... | 123/90.15 |
| 6,196,175 B1 | 3/2001 | Church | .................... | 123/90.16 |
| 6,273,039 B1 | 8/2001 | Church | .................... | 123/90.16 |
| 6,318,325 B1 * | 11/2001 | Lechner | .................... | 123/90.55 |
| 6,321,704 B1 | 11/2001 | Church et al. | ........... | 123/90.16 |
| 6,321,705 B1 | 11/2001 | Fernandez et al. | ........ | 123/90.16 |
| 6,325,030 B1 | 12/2001 | Spath et al. | ............. | 123/90.16 |
| 6,325,034 B1 | 12/2001 | Edelmayer | ............... | 123/90.43 |
| 6,328,009 B1 | 12/2001 | Brothers | .................. | 123/90.35 |
| 6,418,904 B2 | 7/2002 | Hannon | .................. | 123/198 F |
| 6,439,179 B2 | 8/2002 | Hendriksma et al. | .... | 123/90.16 |
| 6,513,470 B1 | 2/2003 | Hendriksma et al. | .... | 123/90.16 |
| 2003/0196620 A1 | 10/2003 | Spath | ....................... | 123/90.16 |

OTHER PUBLICATIONS

"Eaton adds variability to Displacement on Demand," Frank Bokulich, Automotive Engineering International Tech Brief, Jan. 2002.
"GM Power Train Displaces on Demand," Jean L. Broge, Automotive Engineering International Online, Jul. 2001.
"GM Technology," Daniel J. Holt, Service Tech Magazine, Jul. 2001.
"Eaton adds variablity to Displacement on Demand," Frank Bokulich, Automotive Engineering International Tech Brief, Jan. 2002.
Prints, Mar. 14, 2000.
Prints, Nov. 30, 2000.
Print, Feb. 25, 2000.
"Hydraulic Valve Lifter," Delphi, Jul. 2, 2002.
Prints, Jul. 16,2001.
Prints, Aug. 24, 2001.
Prints, Jul. 16, 2001.
Prints, Jul. 17, 2001.
Prints, Jan. 16, 2002.
Correspondence, Dhruva Mandal, Jun. 15, 2001.
Prints, Aug. 24, 2001.
Prints, Jul. 16, 2001.
Prints, Jun. 7, 2001.
Prints, Jan. 16, 2002.
Prints, Jul. 17, 2000.
Correspondence, Jerry Giessinger, Sep. 11, 2001.
Prints, Jun. 17, 2000.
Prints, May 30, 2001.
Drawings, Undated.
Prints, Jun. 21, 1999.
Prints, Jun. 21, 1999.
Prints, Sep. 5, 2001.
Prints, Nov. 22, 2000.
Correspondence, Jerry Giessenger, Sep. 11, 2001.
Prints, Sep. 9, 2001.
Prints, Aug. 1, 2001.
Prints, Jul. 25, 2001.
Prints, Aug. 20, 2001.
Roller Lifter Body Powerpoint, Feb. 6, 2002.
Flyer, Undated.
Prints, Jan. 26, 1989.
Prints, Oct. 7, 1985.
Prints, May 1, 1985.
Prints, May 31, 1985.
Prints, Mar. 6, 1986.
Prints, Feb. 20, 1989.
Prints, Jan. 29, 1986.
Prints, Feb. 25, 2000.
Correspondence, Jan. 31, 2002.
Prints, Dec. 12, 2001.
Prints, Dec. 17, 2001.
Prints, Dec. 10, 2001.
Prints, Dec. 7, 2001.
Prints, Jul. 15, 1988.
Prints, Oct. 2, 1985.
Coresspondence, Bob McCormick, Aug. 6, 1986.
Prints, Feb. 2, 1986.
Report, D. Burkeen, May 9, 1985.
Prints, Feb. 12, 1986.
Prints, Jul. 16, 1986.
Prints, Apr. 11, 1990.
Prints, Jun. 18, 1992.
Prints, Mar. 16, 1984.
Prints, Jul. 20, 1984.
Prints, Dec. 10. 1984.
Prints, Jan. 2, 1985.
Prints, Jul. 10, 1985.
Prints, Jul. 8, 1985.
Print, May 18, 1985.
Print, Jun. 6, 1985.
Prints, Jul. 26, 1985.
Print, Jan. 2, 1985.
Print, Dec. 10, 1984.
Print, Jan. 2, 1995.
Print, Mar. 6, 1985.
Print, Jun. 23, 1969.
Prints, Jun. 12, 1967.
Print, Undated.
Print, Jul. 22, 1974.
Prints, Sep. 7, 1972.
Print, Nov. 9, 1982.
Print, Aug. 21, 1981.
Print, Sep. 3, 1986.
Prints, Apr. 19, 1982.
Print, Sep. 5, 1985.
Print, Oct. 3, 1985.
Prints, Sep. 11, 1985.
Print, Oct. 7, 1985.
Print, Sep. 23. 1985.
Print, Mar. 4, 1985.

Print, Jul. 12, 1982.
Prints, Jan. 6, 1986.
Print, May 7, 1984.
Print, Apr. 5, 1985.
Print, Sep. 17, 1985.
Prints, Sep. 17, 1985.
Print, Feb. 12, 1986.
Print, Mar. 16, 1984.
Prints, May 7, 1981.
Print, Jul. 11, 1984.
Print, Jun. 1, 1984.
Print, Feb. 25, 1984.
Print, Mar. 21, 1984.
Print, Mar. 27, 1986.
Prints, Mar. 23, 1989.
Print, Sep. 7, 1972.
Prit, Jul. 22, 1974.
Print, Dec. 4, 1984.
Print, Jul. 15, 1982.
Prints, May 26. 1982.
Print, Apr. 3, 1982.
Print, May 16, 1980.
Print, Aug. 20, 1980.
Print, May 26, 1982.
Prints, Dec. 10, 1984.
Print, Jul. 16, 1984.
Print, Feb. 18, 1980.
Print, May 7, 1981.
Print, Oct. 29, 1982.
Prints, Sep. 26, 1983.
Print, Aug. 22, 1985.
Print, Mar. 23, 1989.
Print, Apr. 4, 1986.
Print, Oct. 18, 1985.
Prints, Jun. 3, 1982.
Prints, Undated.
Print, Apr. 30, 1986.
Print, Jun. 23, 1986.
Prints, Jul. 11, 1984.
Prints, Sep. 16. 1986.
Print, Jul. 10, 1984.
Print, Apr. 30, 1987.
Prints, Oct. 4, 1966.
Print, Oct. 4, 1966.
Prints, Apr. 1, 1986.
Prints, Sep. 9, 1984.
Prints, Sep. 28, 1984.
Prints, Jan. 24, 1986.
Prints, Sep. 26, 1984.
Prints, Feb. 11, 1986.
Prints, Sep. 28, 1982.
Prints, Dec. 17, 1985.
Prints, Oct. 5, 1985.
Prints, Dec. 6, 1990.
Prints, Dec. 12, 1973.
Prints, Jun. 25, 1981.
Prints, Jun. 10, 1969.
Prints, Dec. 8, 1965.
Prints, Oct. 31, 1985.
Prints, Apr. 16, 1985.
Prints, Aug. 8, 1988.
Print, Feb. 21, 1985.
Print, Oct. 31, 1985.
Print, Oct. 30, 1985.
Print, Oct. 31 1985.
Corespondence, Richard Bizer, Aug. 22, 1984.
Print, Sep. 25, 1984.
Print, Sep. 26, 1984.
Print, Jul. 1, 1988.
Print, Dec. 9, 1988.
Prints, Jul. 24, 1981.
Print, Oct. 22, 1985.
Print, Oct. 28, 1985.
Correspondence, Herb Earl, Sep. 17, 1991.
Correspondence, Dan Berg, Mar. 19, 1986.
Print, Dec. 4, 1984.
Print, Dec. 4, 1984.
Print, May 1, 1985.
Print, Mar. 27, 1984.
Correspondence, Dan McMillan, Aug. 2, 1990.
Print, Date Stamped Nov. 13, 1989.
Print, Sep. 28, 1989.
Print, Date Stamped Feb. 2, 1990.
Print, Oct. 22, 1986.
Print, Date Stamped Dec. 1, 1986.
Print, Aug. 29, 1985.
Print, Mar. 6, 1990.
Print, Date Stamped Jul. 15, 1987.
Print, Date Stamped, Sep. 1, 1986.
Print, Date Stamped, Oct. 13, 1989.
Print, Feb. 6, 1990.
Print, May 31, 1985.
Print, Apr. 1, 1986.
Print, Feb. 22, 1981.
Correspondence, Mike S., Jul. 24, 1992.
Print, Dec. 13, 1984.
Print, Jan. 29, 1986.
Print, Jun. 12, 1973.
Print, Nov. 20, 1985.
Print, Jun. 12, 1967.
Print, May 6, 1986.
Print, Feb. 18, 1967.
Print, Dec. 18, 1967.
Print, Dec. 26, 1984.
Print, Nov. 21, 1985.
Print, Dec. 3, 1985.
Print, Sep. 23,1985.
Print, Mar. 6, 1986.
Print, May 3, 1984.
Print, Feb. 20, 1989.
Print, Jun. 11, 1984.
Print, Sep. 27, 1984.
Print, Jan. 15, 1985.
Print, Feb. 8, 1985.
Print, Dec. 3, 1988.
Print, Mar. 13, 1985.
Prints, Dec. 4, 1984.
Print, Jun. 3, 1985.
Prints, Date Stamped Oct. 14, 1986.
Print, Jul. 12, 1984.
Print, Jul. 16, 2001.
Print, Jul. 17, 2001.
Print, Jun. 21, 1999.
Print, Jun. 17, 2000.
Print, Sep. 10, 1985.
Print, Jan. 26, 1989.
Print, Aug. 4, 1988.
Surface Defects of Tappet Push Rod Seat Inserts, Octob.
Print, Jun. 27, 1986.
Print, Jul. 15, 1988.
Print, Jan. 6, 1986.
Print, Jan. 29, 1981.
Prints, Jan. 29, 1981.
Print, Feb. 24, 1989.
Print, Aug. 16, 2001.
Prints, Apr. 11, 1989.
Drawing depicting leakdown plunger, Jan. 10, 1984.
Drawing, Apr. 7, 1986.
Drawing, Jan. 18, 1984.
Drawing depicting leakdown plunger in die block, Oct. 29, 1985.
Drawing depicting grain flow, Jun. 19, 1985.
Drawing depicting leakdown plunger, Oct. 3, 1986.
Drawing, Jun. 15, 1988.
Drawing, Oct. 3, 1986.
Print, Apr. 3, 1989.

Drawing, pre-dating Oct. 18, 2002.
Print, Jul. 25, 1985.
Drawing, Nov. 18, 1986.
Drawing, Apr. 3, 1985.

Drawing, Jan. 8, 1985.
Drawing, May 7, 1985.

* cited by examiner

US 7,273,026 B2

ROLLER FOLLOWER BODY

FIELD OF THE INVENTION

This invention relates to bodies for toilet followers, and particularly to roller followers used in combustion engines.

BACKGROUND OF THE INVENTION

Roller follower bodies are known in the art and are used in camshaft internal combustion engines. Roller follower bodies open and close valves that regulate fuel and air intake. As noted in U.S. Pat. No. 6,323,009 to Brothers, the disclosure of which is hereby incorporated herein by reference, valve lifters are typically fabricated through machining. Col. 8, 11, 1-3. However, machining is inefficient, resulting in increased labor and decreased production.

In U.S. Pat. No. 6,273,039 to Church, the disclosure of which is hereby incorporated herein by reference, a roller follower is disclosed Col. 4, 11, 33-36. However, U.S. Pat. No. 6,273,039 to Church docs not disclose the fabrication of such a roller follower and does not disclose fabricating a roller follower through forging.

The present invention is directed to overcoming this and other disadvantages inherent in prior-art roller followers.

SUMMARY OF THE INVENTION

The scope of the present invention is defined solely by the appended claims, and is not affected to any degree by the statements within this summary. Briefly stated, a roller follower, comprising an outer surface, enclosing a first cavity and a second cavity, wherein the first cavity includes a first inner surface configured to house a cylindrical insert, the second cavity includes a second inner surface cylindrically shaped, and at least one of the cavities is fabricated through forging.

BRIEF DESCRIPTION OF THE DRAWINGS

FIG. 3-*b* depicts the top view of a preferred embodiment of a roller follower body.

DETAILED DESCRIPTION OF THE PRESENTLY PREFERRED EMBODIMENTS

Figure 1:
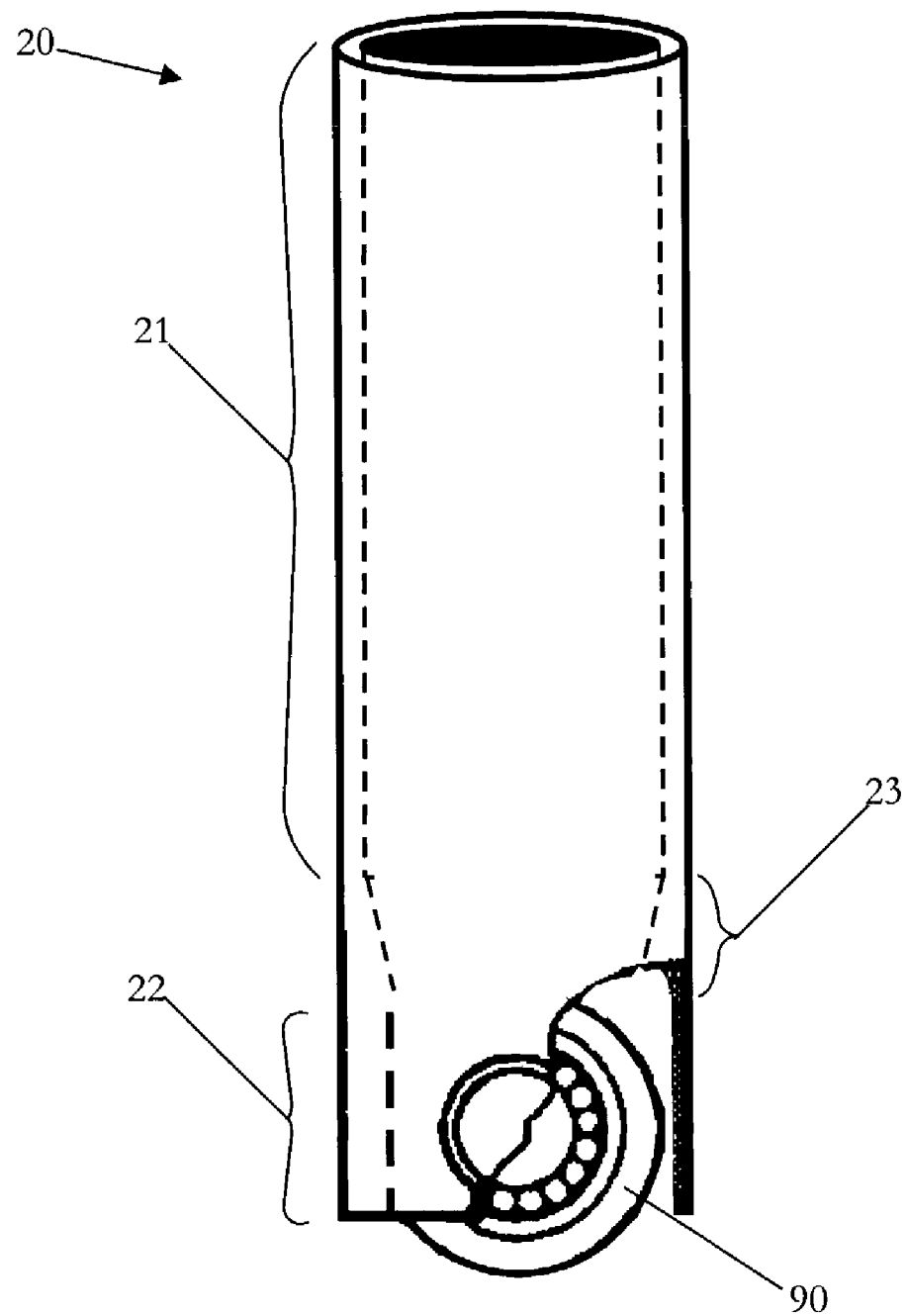
FIG. 1 depicts a preferred embodiment of a roller follower body.
Figure 2:
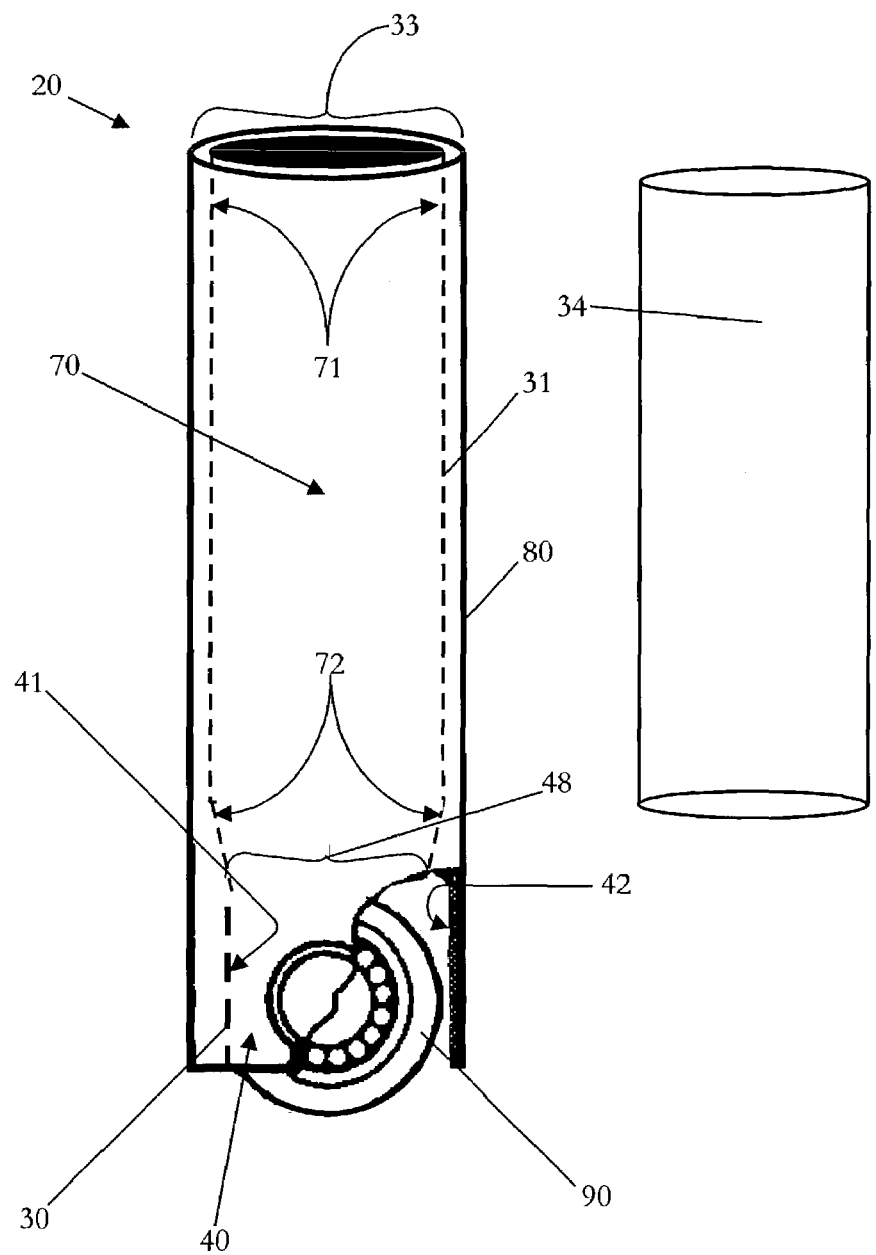
FIG. 2 depicts a preferred embodiment of a roller follower body.

Turning now to the drawings, FIGS. 1, 2, and 3 show a roller follower 10 constituting a preferred embodiment of the present invention. The roller follower 10 is composed of a metal, preferably aluminum. According to one aspect of the present invention, the metal is copper. According to another aspect of the present invention, the metal is iron.

Those skilled in the art will appreciate that the metal is an alloy. According to one aspect of the present invention, the metal includes ferrous and non-ferrous materials. According to another aspect of the present invention, the metal is a steel. Those skilled in the art will appreciate that steel is in a plurality of formulations and the present invention is intended to encompass all of them. According to one embodiment of the present invention the steel is a low carbon steel. In another embodiment of the present invention, the steel is a medium carbon steel. According to yet another embodiment of the present invention, the steel is a high carbon steel.

Those with skill in the art will also appreciate that the metal is a super alloy. According to one aspect of the present invention, the super alloy is bronze; according to another aspect of the present invention, the super alloy is a high nickel material. According to yet another aspect of the present invention, the roller follower 10 is composed of pearlitic material. According to still another aspect of the present invention, the roller follower 10 is composed of austenitic material. According to another aspect of the present invention, the metal is a ferritic material.

The body 20 is composed of a plurality of shaft elements. According to one aspect of the present invention, the shaft element is cylindrical in shape. According to another aspect of the present invention, the shaft element is conical in shape. According to yet another aspect of the present invention, the shaft element is solid. According to still another aspect of the present invention, the shaft element is hollow.

FIG. 1 depicts a cross-sectional view of the preferred embodiment of the present invention composed of a plurality of shaft elements. FIG. 1 shows the body, generally designated 20. The body 20 of the preferred embodiment is fabricated from a single piece of metal wire or rod and is described herein as a plurality of shaft elements. The body 20 includes a first hollow shaft element 21, a second hollow shaft element 22, and a third hollow shaft element 23. As depicted in FIG. 1, the first hollow shaft element 21 is located adjacent to the third hollow shaft element 23. The third hollow shaft element 23 is located adjacent to the second hollow shaft element 22.

The first hollow shaft element 21 has a cylindrically shaped inner surface. The second hollow shaft element 22 has a cylindrically shaped inner surface with a diameter which is smaller than the diameter of the first hollow shaft element 21. The third hollow shaft element 23 has an inner surface shaped so that an insert (not shown) rests against its inner surface "above" the second hollow shaft element 22. Those skilled in the art will understand that, as used herein, terms like "above" and terms of similar import are used to specify general relationships between parts, and not necessarily to indicate orientation of the part or of the overall assembly. In the preferred embodiment, the third hollow shaft element 23 has a conically or frusto-conically shaped inner surface; however, an annularly shaped surface could be used without departing from the scope of the present invention.

The body 20 functions to accommodate a plurality of inserts. According to one aspect of the present invention, the body 20 accommodates a lash adjuster such as that disclosed in "Lash Adjuster Body," application Ser. No. 10/316,263, fled on Oct. 18, 2002, a copy of which is attached hereto, the disclosure of which is hereby incorporated herein by reference. According to another aspect of the present invention, the body 20 accommodates a leakdown plunger, such as that disclosed in "Leakdown Plunger," application Ser. No. 10/274,519, filed on Oct. 18, 2002, a copy of which is attached hereto, the disclosure of which is hereby incorporated herein by reference. According to another aspect of the present invention, the body 20 accommodates a push rod seat (not shown). According to yet another aspect of the present invention, the body 20 accommodates a metering socket such as that disclosed in "Metering Socket," application Ser. No. 10/316,262, filed on Oct. 18, 2002, a copy of which is attached hereto, the disclosure of which is hereby incorporated herein by reference.

The body 20 is prided with a plurality of outer surfaces and inner surfaces. FIG. 2 depicts a cross-sectional view of the preferred embodiment of the present invention. As shown in FIG. 2, the body 20 is provided with an outer surface 80 which is cylindrically shaped. The outer surface 80 encloses a plurality of cavities. As depicted in FIG. 2, the outer surface 80 encloses a first cavity 30 and a second cavity 31. The first cavity 30 includes a first inner surface 40. The second cavity 31 includes a second inner surface 70.

Figure 3A:
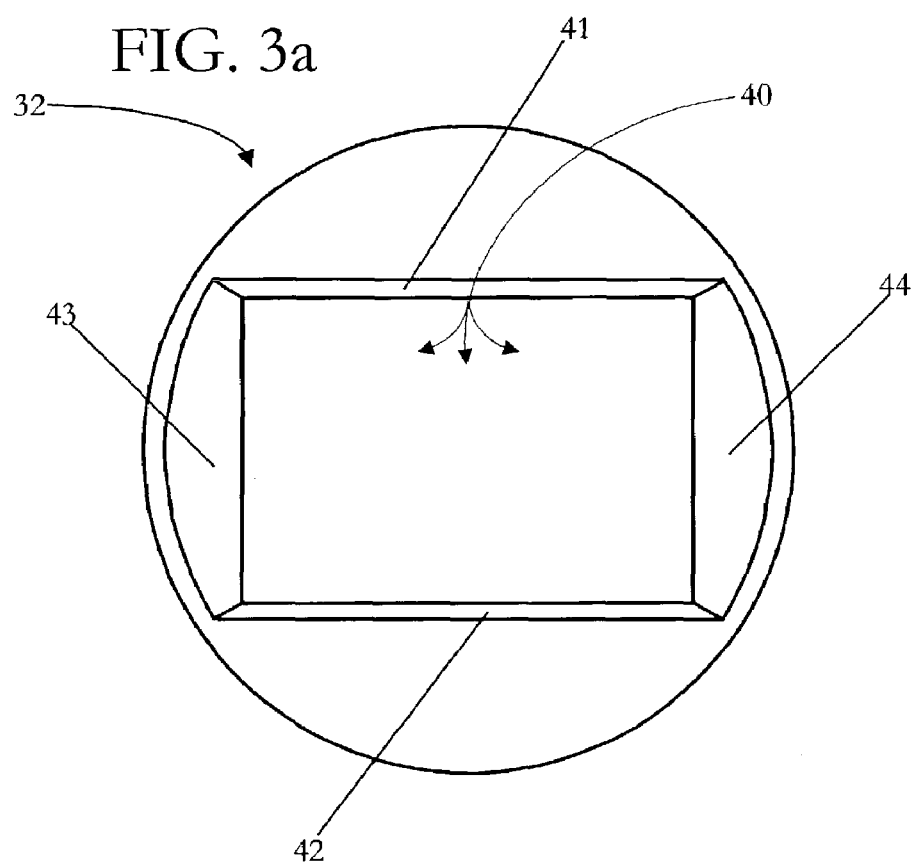
FIG. 3-*a* depicts the top view of a preferred embodiment of a roller follower body.
Figure 3B:
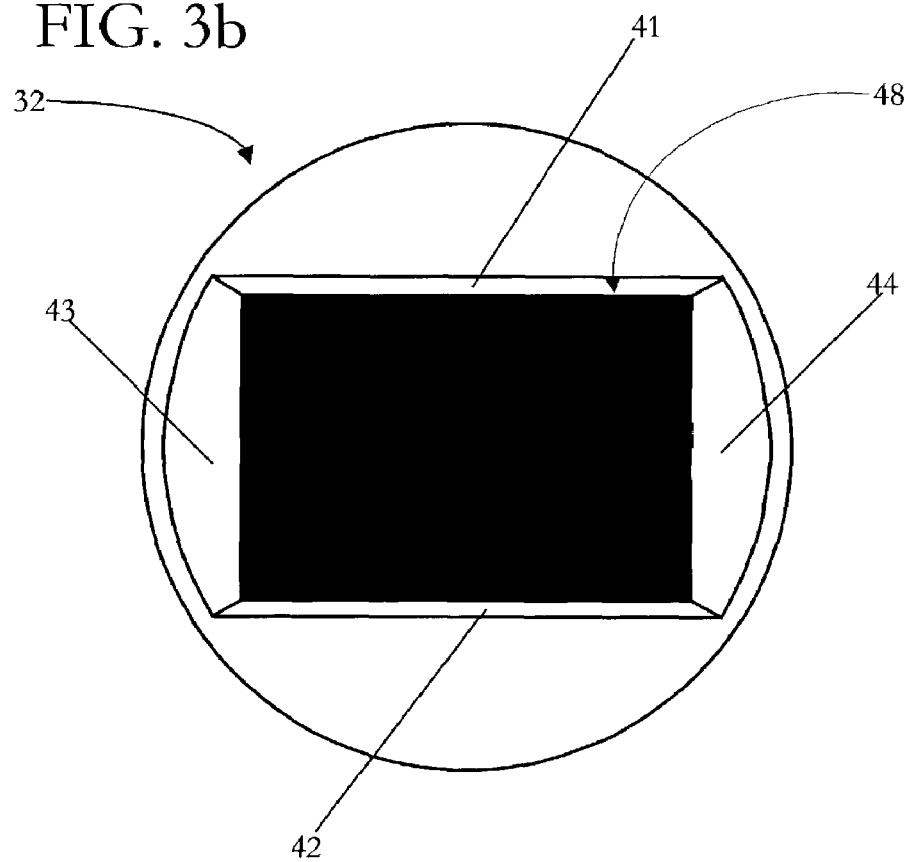

FIG. 3*a* and FIG. 3*b* depict top views and provide greater detail of the first cavity 30 of the preferred embodiment. As shown in FIG. 3*b*, the first cavity 30 is provided with a first opening 32 shaped to accept a cylindrical insert. Referring to FIG. 3*a*, the first inner surface 40 is configured to house a cylindrical insert 90, which, in the preferred embodiment of the present invention, functions as a roller. Those skilled in the art will appreciate that housing a cylindrical insert can be accomplished through a plurality of different configurations. In FIGS. 3*a* and 3*b*, the first inner surface 40 of the preferred embodiment includes a plurality of walls. As depicted in FIGS. 3*a* and 3*b*, the inner surface 40 defines a transition opening 48 which is in the shape of a polygon, the preferred embodiment being rectangular. The inner surface 40 includes a first wall 44, a second wall 42, a third wall 41, and a fourth wall 43. As shown therein, the first wall 44, the second wall 42, the third wall 41, and the fourth wall 43 are positioned so that the first opening 32 is generally rectangular in shape. The third wall 41 and the second wall 42 are located generally on opposite sides of the transition opening 48. The transition opening 48 is further defined by fourth and first walls 43, 44 which are located generally opposite to each other.

Referring to FIG. 2, the body 20 of the present invention is provided with a second cavity 31 that includes a second opening 33 that is in a circular shape. The second cavity 31 is provided with a second inner surface 70 configured to house an inner body 34. The second inner surface 70 of the preferred embodiment is cylindrically shaped. Alternatively, the second inner surface 70 is conically or frusto-conically shaped. As depicted in FIG. 2, the second inner surface 70 is a plurality of surfaces including a cylindrically shaped surface 71 adjacent to a conically or frusto-conically shaped surface 72.

The present invention is fabricated through a plurality of processes. According to one aspect of the present invention, the roller follower 10 is machined. According to another aspect of the present invention, the roller follower 10 is forged. According to yet another aspect of the present invention, the roller follower 10 is fabricated through casting. The preferred embodiment of the present invention is forged. As used herein, the term "forge," "forging," or "forged" is intended to encompass what is known in the art as "cold forming" "cold heading," "deep drawing," and "hot forging."

The preferred embodiment is forged with use of a National® 750 parts former machine. However, those skilled in the art will appreciate that other part formers, such as, for example, a Waterbury machine can be used. Those skilled in the art will further appreciate that other forging methods can be used as well.

The process of forging the preferred embodiment begins with a metal wire or metal rod which is drawn to size. The ends of the wire or rod are squared off by a punch. After being drawn to size, the wire or rod is run through a series of dies or extrusions.

The second cavity 31 is extruded through use of a punch and an extruding pin. After the second cavity 31 has been extruded, the first cavity 30 is forged. The first cavity 30 is extruded through use of an extruding punch and a forming pin.

Alternative, the body 20 is fabricated through machining. As used herein, machining means the use of a chucking machine, a drilling machine, a grinding machine, or a broaching machine. Machining is accomplished by first feeding the body 20 into a chucking machine, such as an ACME-Gridley automatic chucking machine. Those skilled in the art will appreciate that other machines and other manufacturers of automatic chucking machines can be used.

To machine the second cavity 31, the end containing the second opening 33 is faced so that it is substantially flat. The second cavity 31 is bored. Alternatively, the second cavity 31 can be drilled and then profiled with a special internal diameter forming tool.

After being run trough the chucking machine, heat-treating is completed so that the required Rockwell hardness is achieved. Those skilled in the art will appreciate that this can be accomplished by applying heat so that the material is beyond its critical temperature and then oil quenching the material.

After heat-treating, the second cavity 31 is ground using an internal diameter grinding machine, such as a Heald grinding machine. Those skilled in the art will appreciate that the second cavity 31 can be ground using other grinding machines.

Those skilled in the art will appreciate that the other features of the present invention may be fabricated through machining. For example, the first cavity 30 can be machined. To machine the first cavity 30, the end containing the first opening 32 is faced so that it is substantially flat. The first cavity 30 is drilled and then the first opening 32 is broached using a broaching machine.

Figure 4:
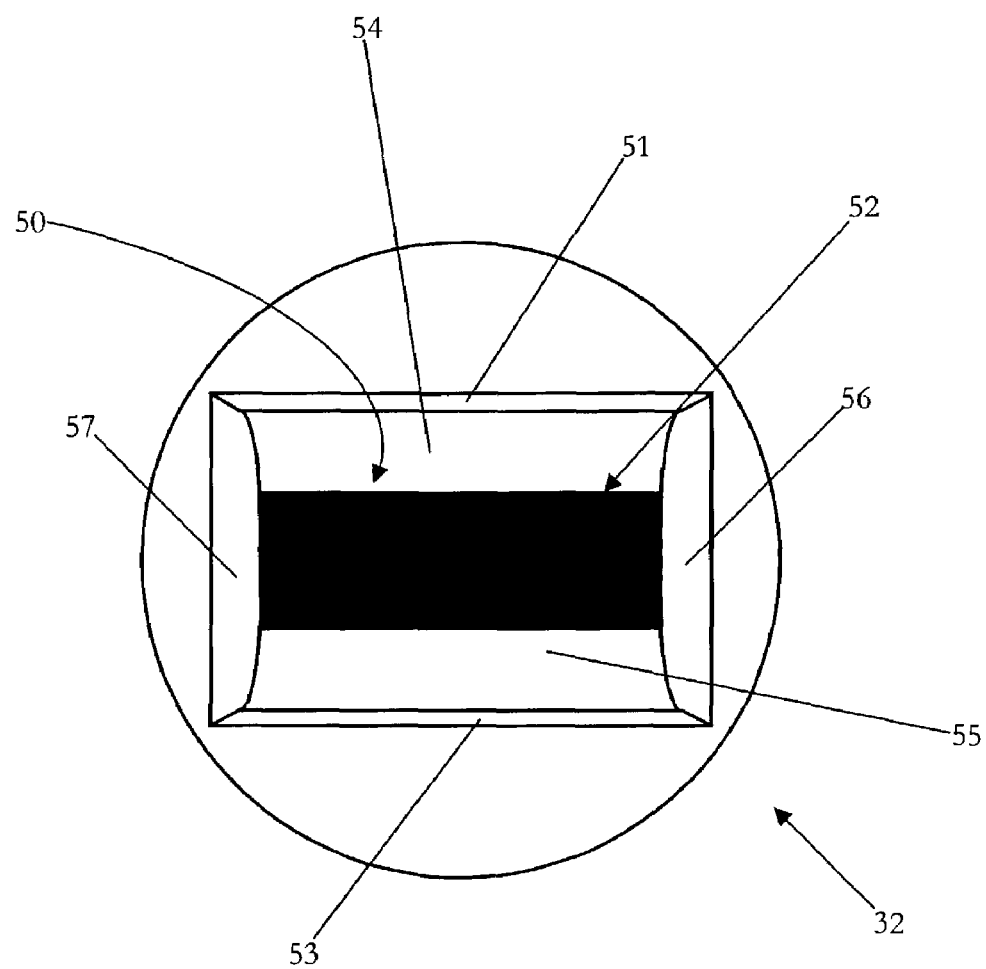
FIG. 4 depicts the top view of another preferred embodiment of a roller follower body.

In an alternative embodiment of the present invention depicted in FIG. 4, the first cavity 30 is provided with a first inner surface 50 and first opening 32 shaped to accept a cylindrical insert 90. The first inner surface 50 defines a transition opening 52 and includes a plurality of curved surfaces and a plurality of walls. As depicted in FIG. 4, a third wall 51 is adjacent to a first curved surface 54. The first curved surface 54 and a second curved surface 55 are located on opposing sides of the transition opening 52. The second curved surface 55 is adjacent to a fourth wall 53. On opposing sides of the second flat surface 53 are first and second walls 56, 57. As FIG. 4 depicts, the walls, 56, 57 and the curved surfaces 54, 55 extend axially into the first cavity 30 and terminate rectangularly. The walls 56, 57 and the curved surfaces 54, 55 terminate to form a transition opening 52 that is generally rectangular in shape. Also shown therein, the walls 51, 53, 56, and 57 are positioned so that the first opening 32 is generally rectangular in shape.

Figure 5:
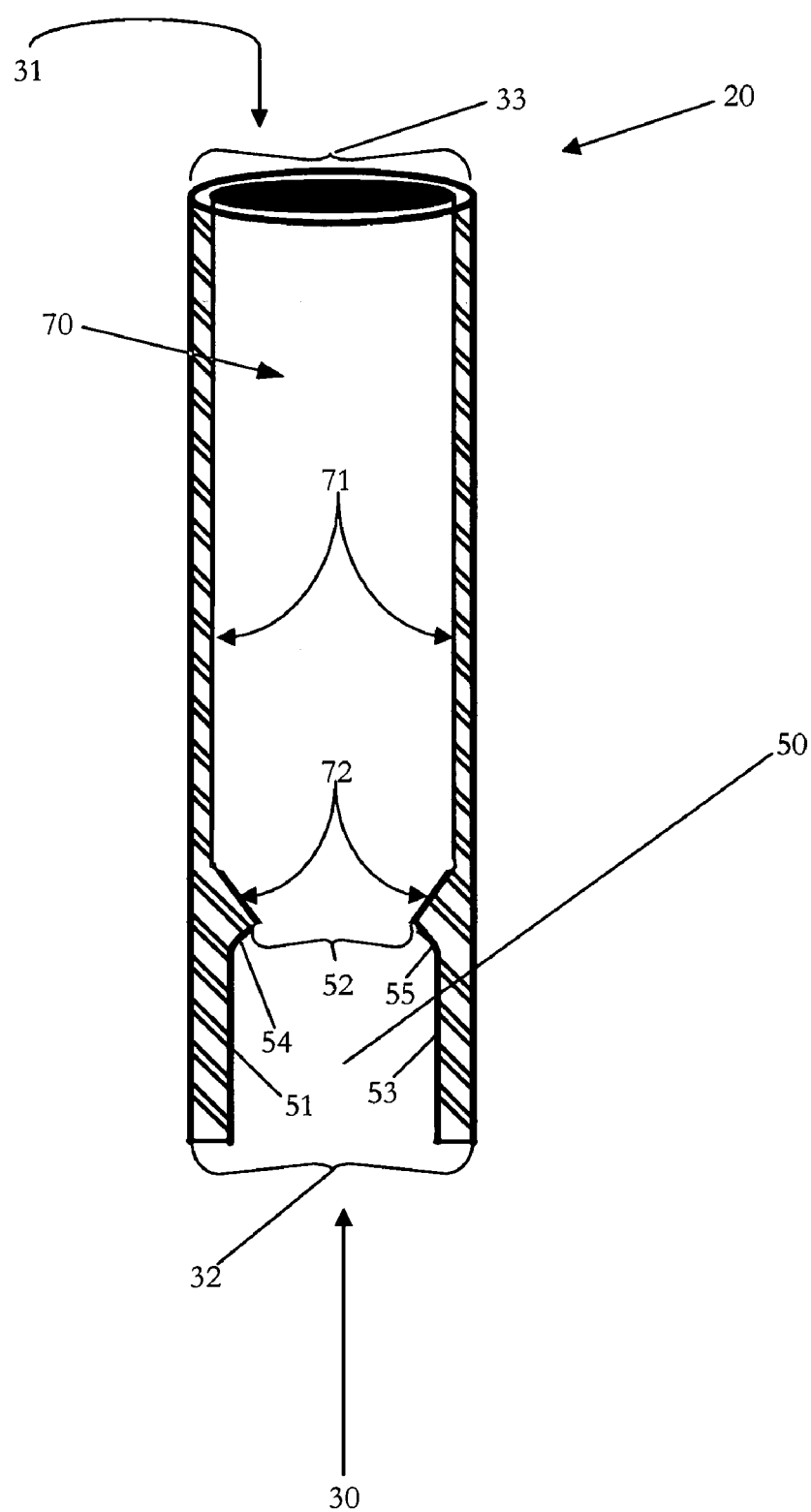
FIG. 5 depicts a second embodiment of a roller follower body.

FIG. 5 depicts a cross-sectional view of the body 20 with the first cavity 30 shown in FIG. 4. As shown in FIG. 5, the body 20 is also provided with a second cavity 31 which includes a second opening 33 which is in a circular shape. The second cavity 31 is provided with a second inner surface 70 which includes a plurality of surfaces. The second inner surface 70 includes a cylindrically shaped surface 71 and a frusto-conically shaped surface 72.

Figure 6:
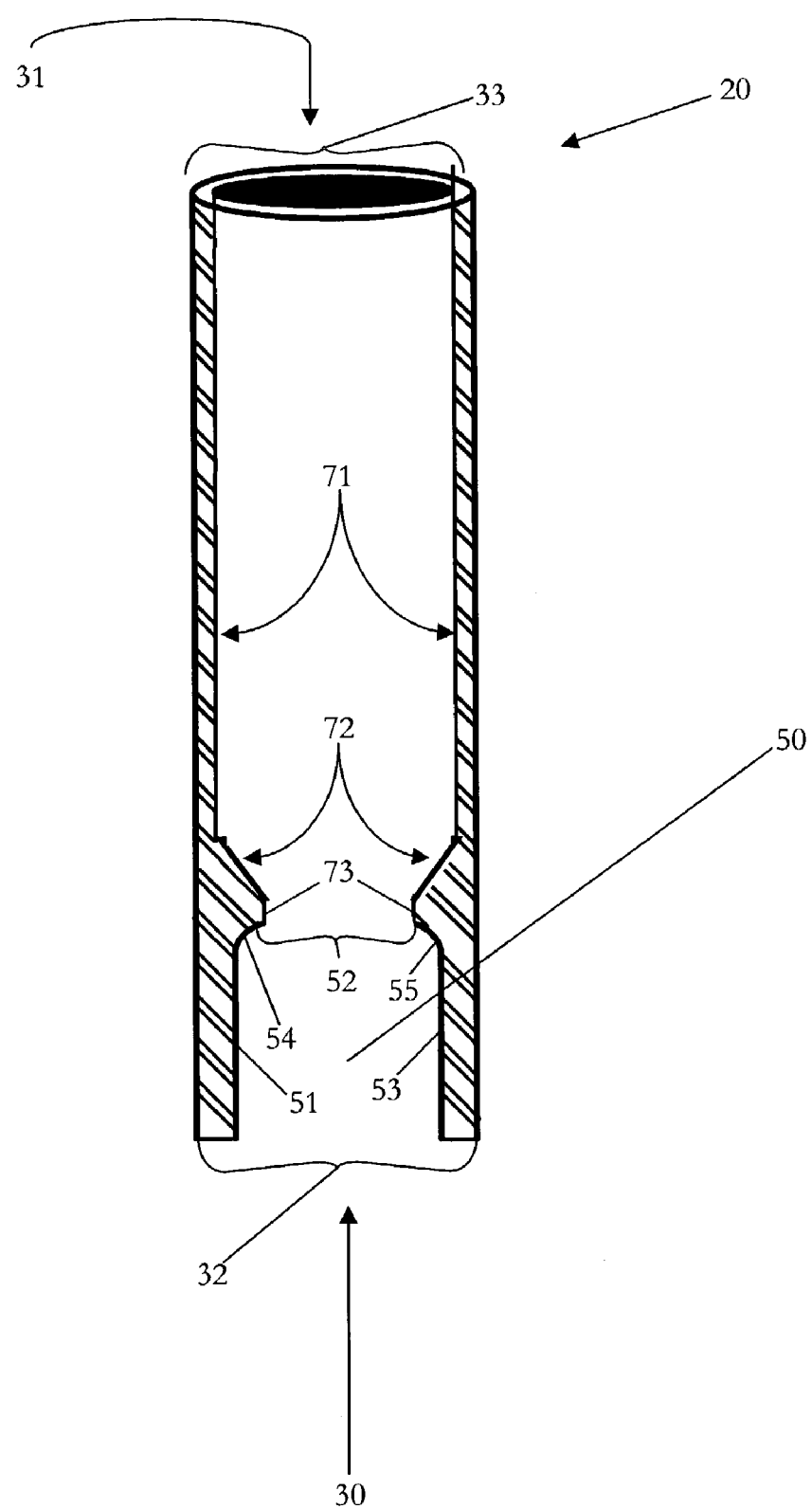
FIG. 6 depicts a third embodiment of a roller follower body.

Alternatively, the second inner surface 70 may include a plurality of cylindrical surfaces. As depicted in FIG. 6, the second inner surface 70 includes a first cylindrical surface 71 and a second cylindrical surface 73. The second inner surface 70 of the embodiment depicted in FIG. 6 also includes a frusto-conical surface 72. FIG. 6 further depicts the frusto-conical surface 72 terminating at a cylindrically shaped surface, referred hereto as the second cylindrical surface 73. As FIG. 6 depicts the second cylindrical surface is generally located at the transition 52.

Figure 7:
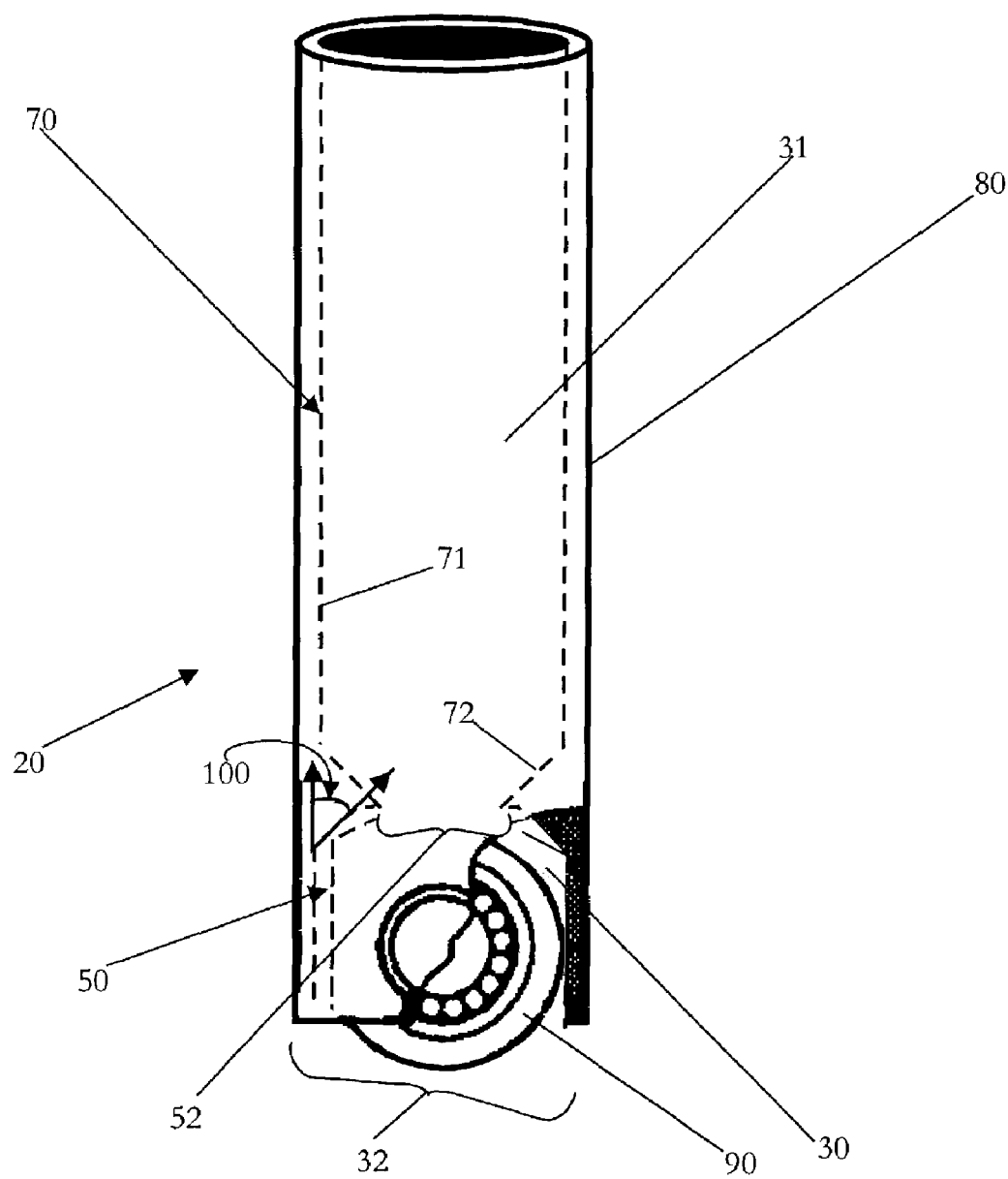
FIG. 7 depicts a fourth embodiment of a roller follower body.

In yet another alternative embodiment of the present invention, as depicted in FIG. 7, the first cavity 30 is provided with a first opening 32 shaped to accept a cylindrical insert and a first inner surface 50. The first inner surface 50 defines a transition opening 52 linking the first cavity 30 with a second cavity 31. The second cavity 31 is provided with a second inner surface 70 which includes a plurality of surfaces. As shown in FIG. 7, the second inner surface 70 includes a cylindrical surface 71 and a frusto-conical surface 72.

Referring again to FIG. 6, the first cavity 50 is depicted with the first opening 32, the first inner surface 50 with the first curved surface 54 and the second curved surface 55, and the transition or transition opening 52. As shown therein, the first curved surface 54 and the second curved surface 55 terminate at a cylindrically shaped surface referred hereto as the second cylindrical surface 73. FIG. 6 further depicts the second cylindrical surface 73 generally located at the transition 52.

Figure 8:
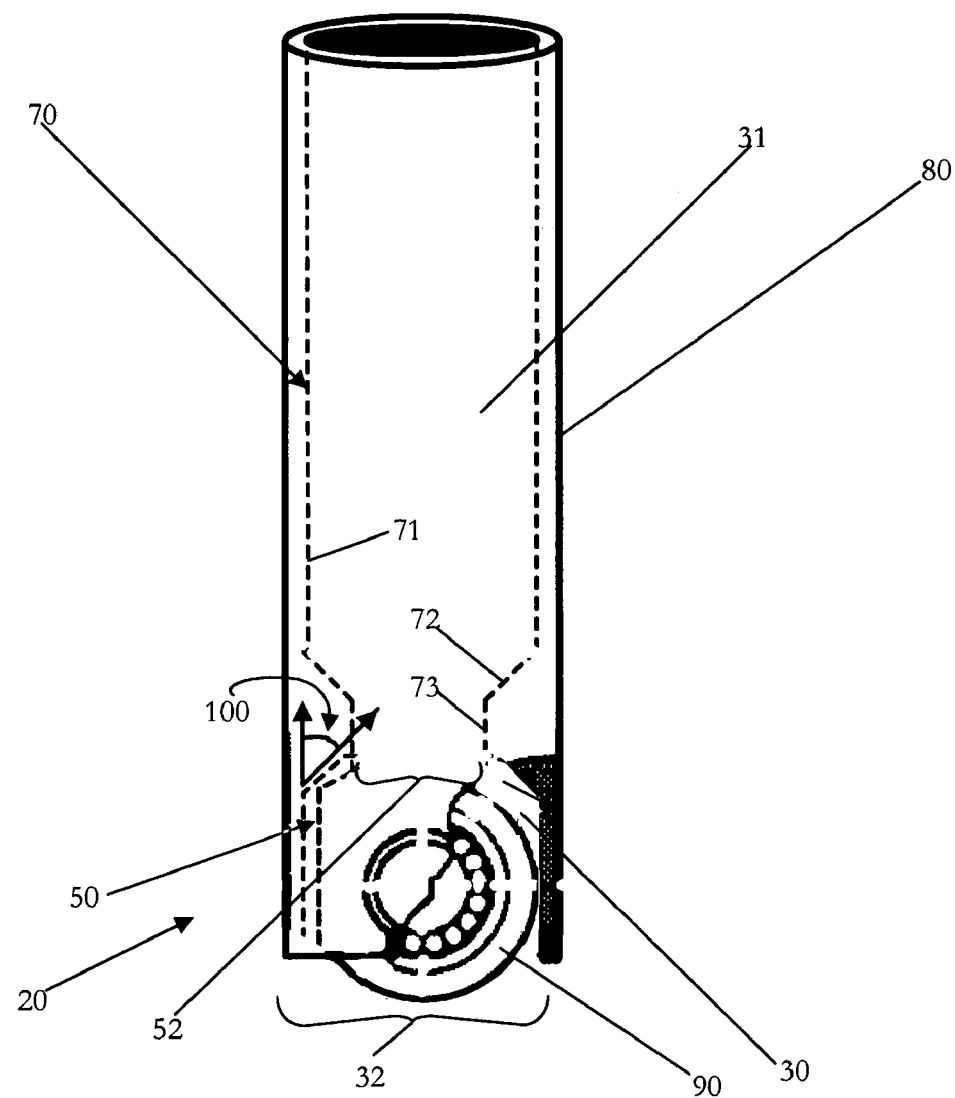
FIG. 8 depicts a fifth embodiment of a roller follower body.

Those skilled in the art will appreciate that the second inner surface 70 may include a plurality of cylindrical surfaces. FIG. 8 depicts a second inner surface 70 which includes a first cylindrical surface 71 adjacent to a frusto-conical surface 72. Adjacent to the frustoconical surface 72 is a second cylindrical surface 73. The second cylindrical surface 73 depicted in FIG. 8 defines a transition opening 52 linking a second cavity 31 with a first cavity 30. The first cavity 30 is provided with a first inner surface 50 and a first opening 32 shaped to accept a cylindrical insert. The first inner surface 50 includes a plurality of walls, angled surfaces and curved surfaces.

Figure 9:
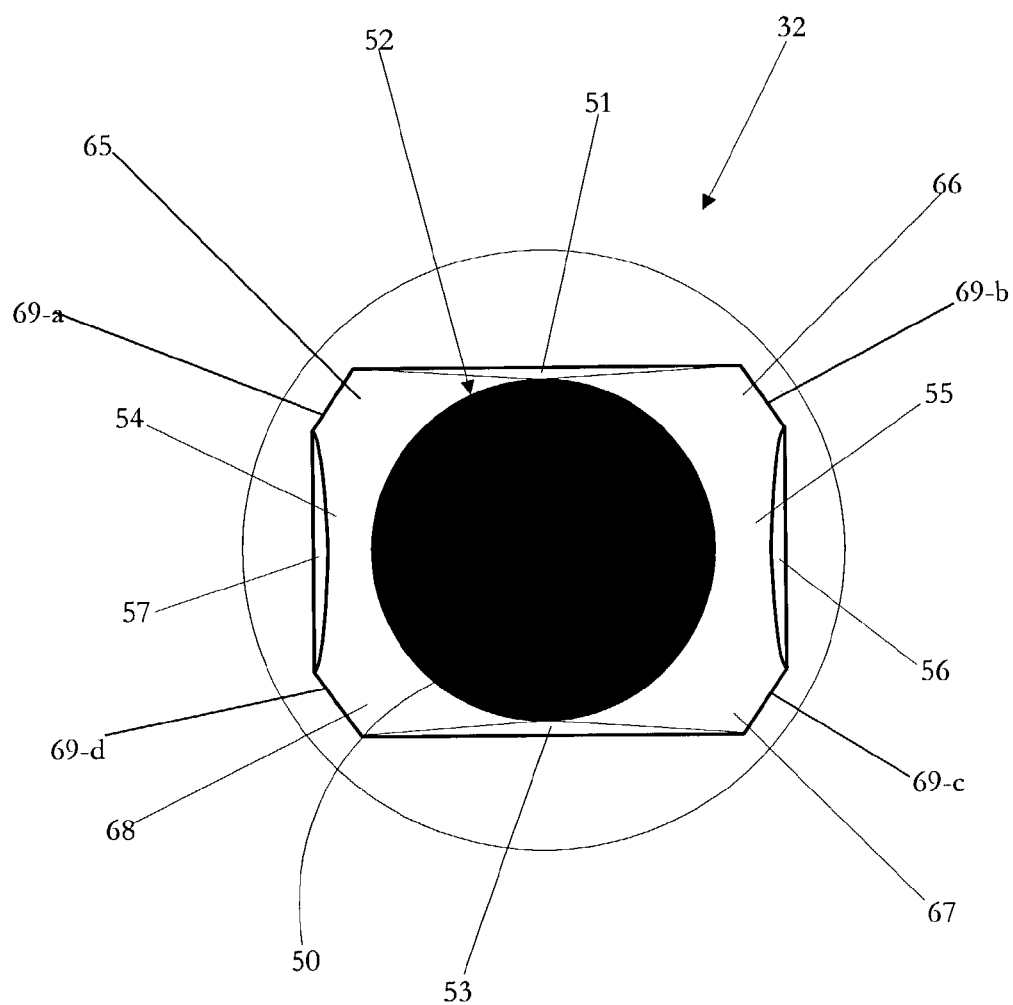
FIG. 9 depicts the top view of another prefer embodiment of a roller follower body.

FIG. 9 depicts a first inner surface 50 depicted in FIGS. 7 and 8. A third wall 51 is adjacent to the transition opening 52, a first angled surface 65, and a second angled surface 66. The first angled surface 65 is adjacent to the transition opening 52, a first curved surface 54, and a first angled wall 69-a. As depicted in FIGS. 7 and 8, the first angled surface 65 is configured to be at an angle 100 relative to the plane of a first angled wall 69-a, preferably between sixty-five and about ninety degrees.

The second angled surface 66 is adjacent to the transitional opening 52 and a second angled wall 69-b. As shown in FIGS. 7 and 8, the second angled surface 66 is configured to be at an angle 100 relative to the plane of the second angled wall 69-b, preferably between sixty-five and about ninety degrees. The second angled surface 66 is adjacent to a second curved surface 55. The second curved surface 55 is adjacent to a third angled surface 67 and a first wall 56. The third angled surface 67 is adjacent to the transitional opening 52, a fourth wall 53, and a third angled wall 69-c. As depicted in FIGS. 7 & 8, the third angled surface 67 is configured to be at an angle 100 relative to the plane of the third angled wall 69-c, preferably between sixty-five and about ninety degrees.

The fourth wall 53 is adjacent to a fourth angled surface 68. The fourth angled surface 68 adjacent to the first curved surface 54, a fourth angled wall 69-d, and a second wall 57. As depicted in FIGS. 7 and 8, the fourth angled surface 68 is configured to be at an angle relative to the plane of the fourth angled wall 69-d, preferably between sixty-five and about ninety degrees. FIGS. 7 and 8 depict cross-sectional views of embodiments with the first cavity 30 of FIG. 9. As shown therein, the walls 51, 53, 56, and 57 are positioned so that the first opening 32 is generally rectangular in shape.

Figure 10:
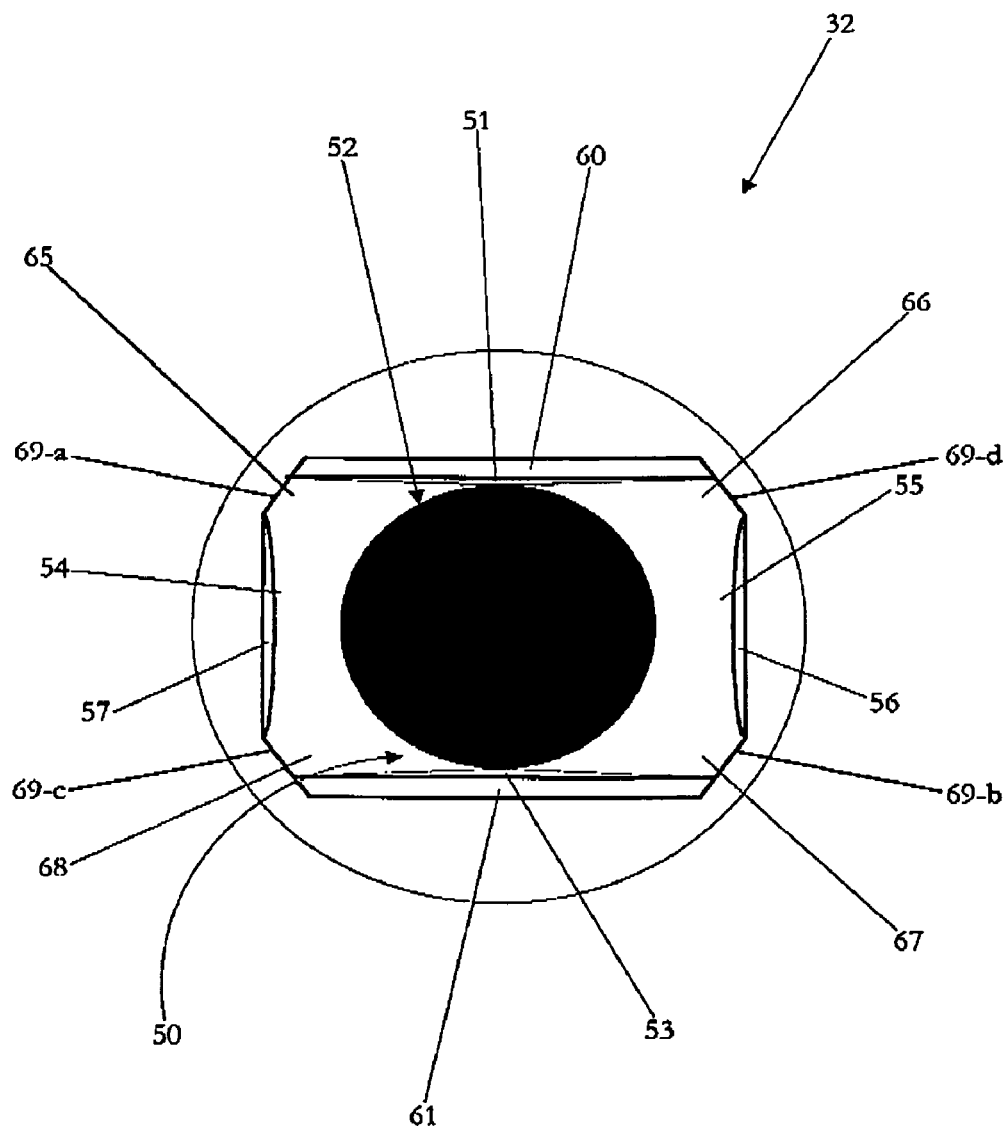
FIG. 10 depicts the top view of another preferred embodiment of a roll follower body.

Shown in FIG. 10 is an alternative embodiment of the first cavity 30 depicted in FIG. 9. In the embodiment depicted in FIG. 10, the first cavity 30 is provided with a chamfered opening 32 and a first inner surface 50. The chamfered opening 32 functions so that a cylindrical insert can be introduced to the body 30 with greater ease. The chamfered opening 32 accomplishes this function through chamfers 60, 61 which are located on opposing sides of the chamfered opening 32. The chamfers 60, 61 of the embodiment shown in FIG. 10 are flat surfaces at an angle relative to the third and fourth walls 51, 53 so that a cylindrical insert 90 can be introduced through the first opening 32 with greater ease. Those skilled in the art will appreciate that the chamfers 60, 61 can be fabricated in a number of different configurations; so long as the resulting configuration renders introduction of a cylindrical insert 90 through the first opening 32 with greater ease, it is a "chamfered opening" within the spirit and scope of the present invention. As shown therein, the walls 51, 53, 56, and 57 are positioned so that the first opening 32 is generally rectangular in shape.

The chamfers 60, 61 are preferably fabricated through forging via an extruding punch pin. Alternatively, the chamfers 60, 61 are machined by being ground before heat-treating. Those skilled in the art will appreciate that other methods of fabrication can be employed within the scope of the present invention.

Figure 11:
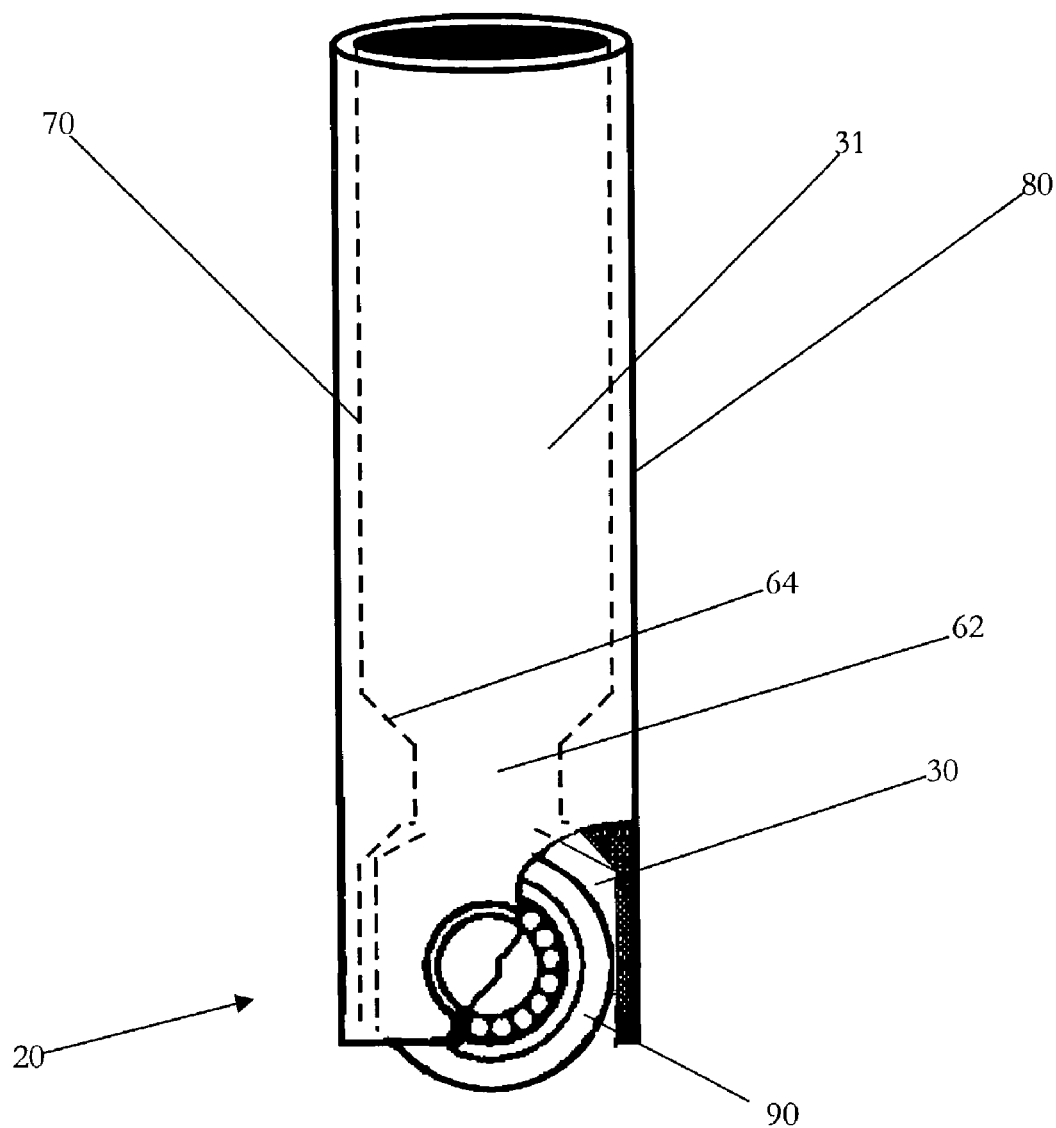
FIG. 11 depicts a sixth embodiment of a roller follower body.

FIG. 11 discloses yet another alternative embodiment of the present invention. As depicted in FIG. 11, the body 20 is provided with a second cavity 31 which includes a plurality of cylindrical and conical surfaces. The second cavity 31 depicted in FIG. 11 includes a second inner surface 70. The second inner surface 70 of the preferred embodiment is cylindrically shaped, concentric relative to the cylindrically shaped outer surface 80. The second inner surface 70 is provided with a transition or transitional tube 62. The transitional tube 62 is shaped to fluidly link the second cavity with a first cavity 30. In the embodiment depicted in FIG. 11, the transitional tube 62 is cylindrically shaped at a diameter that is smaller than the diameter of the second inner surface 70. The cylindrical shape of the transitional tube 62 is preferably concentric relative to the outer surface 80. The transitional tube 62 is preferably forged through use of an extruding die pin.

Alternatively, the transitional tube 62 is machined by boring the transitional tube 62 in a chucking machine. Alternatively, the transitional tube 62 can be drilled and then profiled with a special internal diameter forming tool. After being run through the chucking machine, heat-treating is completed so that the required Rockwell hardness is achieved. Those skilled in the art will appreciate that heat-treating can be accomplished by applying heat so that the material is beyond its critical temperature and then oil quenching the material. After heat-treating, the transitional tube 62 is ground using an internal diameter grinding machine, such as a Heald grinding machine. Those skilled in the art will appreciate that the transitional tube 62 can be ground using other grinding machines.

Adjacent to the transitional tube 62, the embodiment depicted in FIG. 11 is provided with a conically-shaped lead surface 64 which can be fabricated through forging or machining. However, those skilled in the art will appreciate that the present invention can be fabricated without the lead surface 64.

Figure 12:
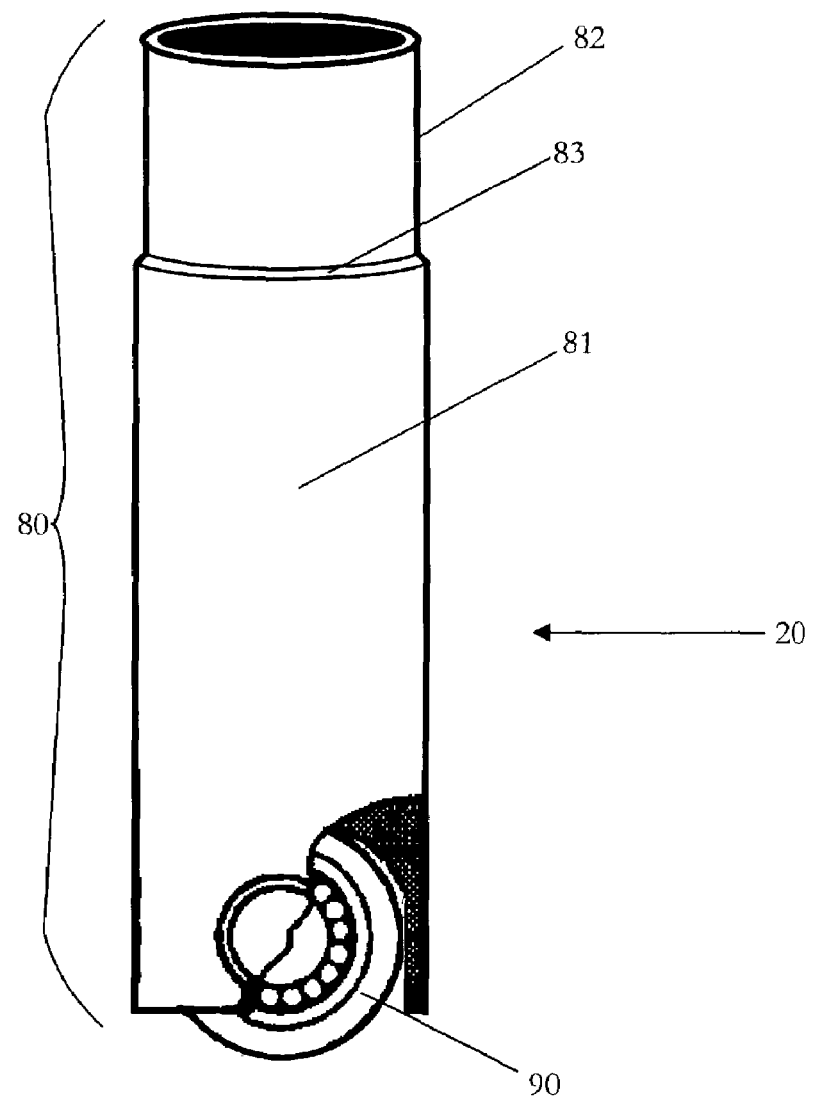
FIG. 12 depicts a seventh embodiment of a roller follower body.

Depicted in FIG. 12 is another alternative embodiment of the present invention. As shown in FIG. 12, the body 20 is provided with an outer surface 80. The outer surface 80 includes a plurality of surfaces. In the embodiment depicted in FIG. 12, the outer surface 80 includes a cylindrical surface 81, an undercut surface 82, and a frusto-conical surface 83. As depicted in FIG. 12, the undercut surface 82 extends from one end of the body 20 and is cylindrically shaped. The diameter of the undercut surface 82 is smaller than the diameter of the cylindrical surface 81.

The undercut surface 82 is preferably forged through use of an extruding die. Alternatively, the undercut surface 82 is fabricated through machining. Machining the undercut surface 82 is accomplished through use of an infeed centerless grinding machines such as a Cincinnati grinder. The surface is first heat-treated and then the undercut surface 82 is ground via a grinding wheel. Those skilled in the art will appreciate that additional surfaces can be ground into the outer surface with minor alterations to the grinding wheel.

As depicted in FIG. 12, the frusto-conical surface 83 is located between the cylindrical surface and the undercut surface. The frusto-conical surface 83 is preferably forged through use of an extruding die. Alternatively, the frusto-conical surface 83 is fabricated trough machining. Those with skill in the art will appreciate that the outer surface 80 can be fabricated without the frusto-conical surface 83 so that the cylindrical surface 81 and the undercut surface 82 abut one another.

Figure 13:
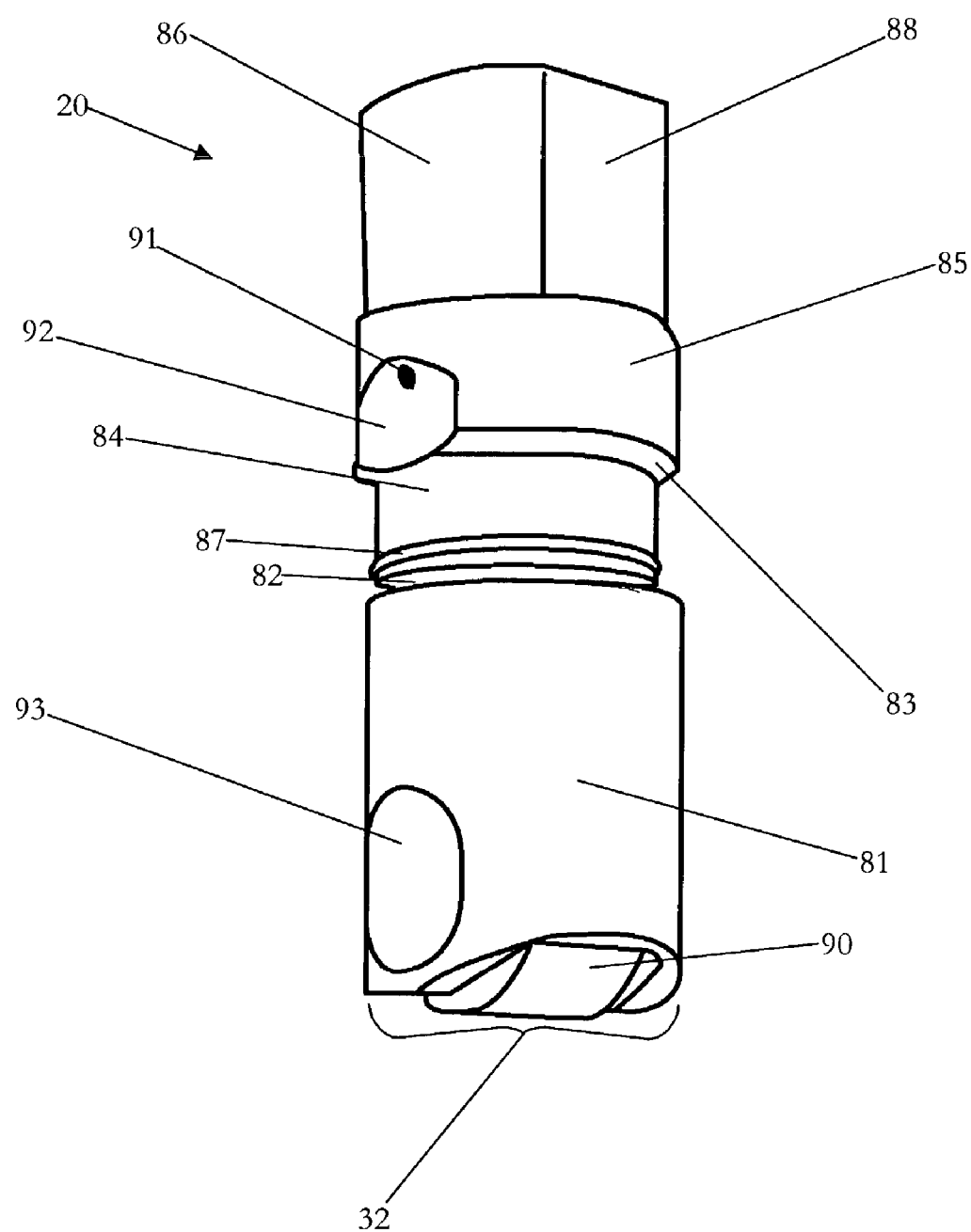
FIG. 13 depicts an eighth embodiment of a roller follower body.

FIG. 13 depicts another embodiment of the present invention. In the embodiment depicted in FIG. 13, the outer surface 80 includes a plurality of outer surfaces. The outer surface 80 is provided with a first cylindrical surface 81. The first cylindrical surface 81 contains a first depression 93. Adjacent to the first cylindrical surface 81 is a second cylindrical surface 82. The second cylindrical surface 82 has a radius that is smaller than the radius of the first cylindrical surface 81. The second cylindrical surface 82 is adjacent to a third cylindrical surface 84. The third cylindrical surface 84 has a radius that is greater than the radius of the second cylindrical surface 82. The third cylindrical surface 84 contains a ridge 87. Adjacent to the third cylindrical surface 84 is a frusto-conical surface 83. The frusto-conical surface 83 is adjacent to a fourth cylindrical surface 85. The fourth cylindrical surface 85 and the frusto-conical surface 83 contain a second depression 92. The second depression 92 defines a hole 91. Adjacent to the fourth cylindrical surface 85 is a flat surface 88. The flat surface 88 is adjacent to a fifth cylindrical surface 86. As shown in FIG. 13, the fifth cylindrical surface 86 is an undercut surface that includes the flat outer surface 88.

Those skilled in the art will appreciate that the features of the present invention nay be fabricated through a combination of machining, forgoing, and other methods of fabrication. By way of example and not limitation, the first cavity 30 can be machined while the second cavity 31 is forged. Conversely, the second cavity 31 can be machined while the first cavity is forged.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A roller follower body, comprising:
   a) a forgeable material that has been cold formed to provide, at least in part, an outer surface, a first end, and a second end;
   b) the outer surface has, at least in part, been machined to include an undercut surface that is generally cylindrical in shape and provided with a reduced diameter relative to at least a portion of the outer surface;
   c) the undercut surface extends from the second end to a generally frusto-conical surface that is located adjacent to a generally cylindrical surface;
   d) a first cavity that has, at least in part, been cold formed into the first end to provide a first inner surface that includes:
      i) a first wall, a second wall, a third wall, a fourth wall, a first angled wall, a second angled wall, a third angled wall, and a fourth angled wall that extend axially into the first end from a first opening;
      ii) the first wall faces the second wall and is located adjacent to the first angled wall and the fourth angled wall;
      iii) the second wall faces the first wall and is located adjacent to the second angled wall and the third angled wall;
      iv) the third wall faces the fourth wall and terminates, at least in part, at a second curved surface;
      v) the fourth wall faces the third wall and terminates, at least in part, at a first curved surface; and
   e) a second cavity that has, at least in part, been cold formed into the second end to provide a second inner surface that is generally cylindrical in shape and generally concentric relative to at least a portion of the outer surface.

2. The roller follower body according to claim 1, further comprising a transition that has been drilled to link the first cavity and the second cavity.

3. The roller follower body according to claim 1, further comprising a transition that has been bored into the roller follower body to link the first cavity and the second cavity.

4. The roller follower body according to claim 1, further comprising a transition that has been ground into the roller follower body to link the first cavity and the second cavity.

5. The roller follower body according to claim 1, further comprising a transition that has been machined into the forgeable material so that the first and second cavities are linked.

6. The roller follower body according to claim 1, further comprising a transition that links the first and second cavities and that is in the form of a transitional tube.

7. The roller follower body according to claim 1, further comprising a transition that links the first and second cavities and that is in the form of a transition opening.

8. The toilet follower body according to claim 1, wherein the second inner surface has been machined, at least in part, so that the second inner surface includes a plurality of cylindrically shaped surfaces.

9. The roller follower body according to claim 1, further comprising a first angled surface located adjacent to the first wall and the fourth wall, a second angled surface located adjacent to the first wall and the third wall, a third angled surface located adjacent to the second wall and the third wall, and a fourth angled surface located adjacent to the second wall and the fourth wall, wherein:
  a) the first angled surface extends from the first angled wall and is generally oriented to be at an angle relative to the plane of the first angled wall that measures between 65 and about 75 degrees;
  b) the second angled surface extends from the fourth angled wall and is generally oriented to be at an angle relative to the plane of the second angled wall that measures between 65 and about 75 degrees;
  c) the third angled surface extends from the second angled wall and is generally oriented to be at an angle relative to the plane of the third angled wall that measures between 65 and about 75 degrees; and
  d) the fourth angled surface extends from the third angled wall and is generally oriented to be at an angle relative to the plane of the fourth angled wall that measures between 65 and about 75 degrees.

10. The roller follower body according to claim 1, further comprising a first angled surface located adjacent to the first wall and the fourth wall, a second angled surface located adjacent to the first wall and the third wall, a third angled surface located adjacent to the second wall and the third wall, and a fourth angled surface located adjacent to the second wall and the fourth wall, wherein:
  a) the first angled surface extends from the first angled wall and is generally oriented to be at an angle relative to the plane of the first angled wall;
  b) the second angled surface extends from the fourth angled wall and is generally oriented to be at an angle relative to the plane of the second angled wall;
  c) the third angled surface extends from the second angled wall and is generally oriented to be at an angle relative to the plane of the third angled wall; and
  d) the fourth angled surface extends from the third angled wall and is generally oriented to be at an angle relative to the plane of the fourth angled wall.

11. The roller follower body of claim 10, wherein the angled surfaces are generally flat.

12. The roller follower body according to claim 10, further comprising:
  a) a transition that links the first cavity and the second cavity; and
  b) at least one of the curved surfaces terminates, at least in part, at a cylindrically shaped surface that is generally located at the transition.

13. The roller follower body according to claim 10, further comprising:
  a) a transition that links the first cavity and the second cavity; and
  b) a frusto-conically shaped surface that terminates, at least in part, at a cylindrically shaped surface generally located at the transition.

14. A roller follower body, comprising:
  a) a forgeable material that is provided with an axis, an outer surface, a first end with a first opening, and a second end with a second opening;
  b) the outer surface has, at least in part, been cold formed to include an undercut surface that is generally cylindrical in shape and provided with a reduced diameter relative to at least a portion of a generally cylindrical surface located on the outer surface;
  c) the undercut surface extends from the second end to a generally frusto-conical surface that is located adjacent to the generally cylindrical surface;
  d) a first cavity that has, at least in part, been cold formed to provide a first inner surface that extends from the first opening and includes:
    i) a first wall, a second wall, a third wall, a fourth wall, a first angled wall, a second angled wall, a third angled wall, and a fourth angled wall that extend axially into the forgeable material;
    ii) the first wall faces the second wall and is located adjacent to the first angled wall and the fourth angled wall;
    iii) the second wall faces the first wall and is located adjacent to the second angled wall and the third angled wall;
    iv) the third wall faces the fourth wall and terminates, at least in part, at a second curved surface;
    v) the fourth wall faces the third wall and terminates, at least in part, at a first curved surface; and
  e) a second cavity that has, at least in part, been cold formed to provide a second inner surface that extends from the second opening, is generally cylindrical in shape, and is generally concentric relative to at least a portion of the outer surface.

15. The roller follower body according to claim 14, further comprising a transition that has been dilled to link the first cavity and the second cavity.

16. The roller follower body according to claim 14, further comprising a transition that has been bored into the roller follower body to link the first cavity and the second cavity.

17. The roller follower body according to claim 14, further comprising a transition that has been ground into the roller follower body to link the first cavity and the second cavity.

18. The roller follower body according to claim 14, further comprising a transition that has been machined into the forgeable material so that the first and second cavities are linked.

19. The roller follower body according to claim 14, further comprising a transition that links the first and second cavities and that is in the form of a transitional tube.

20. The roller follower body according to claim 14, further comprising a transition that links the first and second cavities and that is in the form of a transition opening.

21. The roller follower body according to claim 14, wherein the second inner surface has been machined, at least in part, so that the second inner surface includes a plurality of cylindrically shaped surfaces.

22. The roller follower body according to claim 14, further comprising a first angled surface located adjacent to the first wall and the fourth wall, a second angled surface located adjacent to the first wall and the third wall, a third angled surface located adjacent to the second wall and the third wall, and a fourth angled surface located adjacent to the second wall and the fourth wall, wherein:

a) the first angled surface extends from the first angled wall and is generally oriented to be at an angle relative to the plane of the first angled wall that measures between 65 and about 75 degrees;
b) the second angled surface extends from the fourth angled wall and is generally oriented to be at an angle relative to the plane of the second angled wall that measures between 65 and about 75 degrees;
c) the third angled surface extends from the second angled wall and is generally oriented to be at an angle relative to the plane of the third angled wall that measures between 65 and about 75 degrees; and
d) the fourth angled surface extends from the third angled wall and is generally oriented to be at an angle relative to the plane of the fourth angled wall that measures between 65 and about 75 degrees.

23. The roller follower body according to claim 14, further comprising a first angled surface located adjacent to the first wall and the fourth wall, a second angled surface located adjacent to the first wall and the third wall, a third angled surface located adjacent to the second wall and the third wall, and a fourth angled surface located adjacent to the second wall and the fourth wall, wherein:
a) the first angled surface extends from the first angled wall and is generally oriented to be at an angle relative to the plane of the first angled wall;
b) the second angled surface extends from the fourth angled wall and is generally oriented to be at an angle relative to the plane of the second angled wall;
c) the third angled surface extends from the second angled wall and is generally oriented to be at an angle relative to the plane of the third angled wall; and
d) the fourth angled surface extends from the third angled wall and is generally oriented to be at an angle relative to the plane of the fourth angled wall.

24. The roller follower body of claim 23, wherein the angled surfaces are generally flat.

25. The roller follower body according to claim 23, further comprising:
a) a transition that links the first cavity and the second cavity; and
b) at least one of the curved surfaces terminates, at least in part, at a cylindrically shaped surface that is generally located at the transition.

26. The roller follower body according to claim 23, further comprising:
a) a transition that links the first cavity and the second cavity; and
b) a frusto-conically shaped surface that terminates, at least in part, at a cylindrically shaped surface generally located at the transition.

27. A roller follower body, comprising:
a) a forgeable material that includes an outer surface, a first end, and a second end;
b) a first cavity that has, at least in part, been cold formed into the first end to provide a first inner surface that includes:
i) a first wall, a second wall, a third wall, a fourth wall, a first angled wall, a second angled wall, a third angled wall, and a fourth angled wall that extend axially into the first end from a first opening;
ii) the first wall faces the second wall and is located adjacent to the first angled wall and the fourth angled wall;
iii) the second wall faces the first wall and is located adjacent to the second angled wall and the third angled wall;
iv) the third wall faces the fourth wall and terminates, at least in part, at a second curved surface;
v) the fourth wall faces the third wall and terminates, at least in part, at a first curved surface;
c) a second cavity that has, at least in part, been cold formed into the second end to provide a second inner surface that is generally concentric relative to at least a portion of the outer surface;
d) the first and second curved surfaces terminate at a transition that connects the first and second cavities;
e) the outer surface has, at least in part, been machined to include an undercut surface that is generally cylindrical in shape and provided with a reduced diameter relative to at least a portion of the outer surface; and
f) the undercut surface extends from the second end to a generally frusto-conical surface that is located adjacent to a generally cylindrical surface.

28. The roller follower body according to claim 27, wherein the transition has been dilled to link the first cavity and the second cavity.

29. The roller follower body according to claim 27, wherein the transition has been bored into the roller follower body to link the first cavity and the second cavity.

30. The roller follower body according to claim 27, wherein the transition has been ground into the roller follower body to link the first cavity and the second cavity.

31. The roller follower body according to claim 27, wherein the transition has been machined into the forgeable material so that the first and second cavities are linked.

32. The roller follower body according to claim 27, wherein the transition that links the first and second cavities is in the form of a transitional tube.

33. The roller follower body according to claim 27, wherein the transition that links the first and second cavities is in the form of a transition opening.

34. The roller follower body according to claim 27, wherein the second inner surface has been machined, at least in part, so that the second inner surface includes a plurality of cylindrically shaped surfaces.

35. The roller follower body according to claim 27, further comprising a first angled surface located adjacent to the first wall and the fourth wall, a second angled surface located adjacent to the first wall and the third wall, a third angled surface located adjacent to the second wall and the third wall, and a fourth angled surface located adjacent to the second wall and the fourth wall, wherein:
a) the first angled surface extends from the first angled wall and is generally oriented to be at an angle relative to the plane of the first angled wall that measures between 65 and about 75 degrees;
b) the second angled surface extends from the fourth angled wall and is generally oriented to be at an angle relative to the plane of the second angled wall that measures between 65 and about 75 degrees;
c) the third angled surface extends from the second angled wall and is generally oriented to be at an angle relative to the plane of the third angled wall that measures between 65 and about 75 degrees; and
d) the fourth angled surface extends from the third angled wall and is generally oriented to be at an angle relative to the plane of the fourth angled wall that measures between 65 and about 75 degrees.

36. The roller follower body according to claim 27, further comprising a first angled surface located adjacent to the first wall and the fourth wall, a second angled surface located adjacent to the first wall and the third wall, a third angled surface located adjacent to the second wall and the third wall, and a fourth angled surface located adjacent to the second wall and the fourth wall, wherein:
  a) the first angled surface extends from the first angled wall and is generally oriented to be at an angle relative to the plane of the first angled wall;
  b) the second angled surface extends from the fourth angled wall and is generally oriented to be at an angle relative to the plane of the second angled wall;
  c) the third angled surface extends from the second angled wall and is generally oriented to be at an angle relative to the plane of the third angled wall; and
  d) the fourth angled surface extends from the third angled wall and is generally oriented to be at an angle relative to the plane of the fourth angled wall.

37. The roller follower body of claim 36, wherein the angled surfaces are generally flat.

38. The roller follower body according to claim 36, wherein
at least one of the curved surfaces terminates, at least in part, at a cylindrically shaped surface that is generally located at the transition.

39. The roller follower body according to claim 36, further comprising:
a frusto-conically shaped surface that terminates, at least in part, at a cylindrically shaped surface generally located at the transition.

40. A roller follower body, comprising:
  a) a forgeable material that has been cold formed to provide, at least in part, an outer surface, a first end, and a second end;
  b) the outer surface has, at least in part, been machined so that:
    i) an undercut surface extends from the second end;
    ii) the undercut surface is provided with a first diameter;
    iii) the undercut surface is adjacent to a generally cylindrical surface;
    iv) at least a portion of the outer surface is provided with a second diameter;
    v) the first diameter of the undercut surface is smaller than the second diameter;
  c) a first cavity that has, at least in part, been cold formed into the first end to provide a first inner surface that includes:
    i) a first wall, a second wall, a third wall, a fourth wall, a first angled wall, a second angled wall, a third angled wall, and a fourth angled wall that extend axially into the first end from a first opening;
    ii) the first wall faces the second wall and is located adjacent to the first angled wall and the fourth angled wall;
    iii) the second wall faces the first wall and is located adjacent to the second angled wall and the third angled wall;
    iv) the third wall faces the fourth wall and terminates, at least in part, at a second curved surface;
    v) the fourth wall faces the third wall and terminates, at least in part, at a first curved surface; and
  d) a second cavity that has, at least in part, been cold formed into the second end to provide a second inner surface that is generally cylindrical in shape and generally concentric relative to at least a portion of the outer surface.

41. The roller follower body according to claim 40, further comprising a transition that has been drilled to link the first cavity and the second cavity.

42. The roller follower body according to claim 40, further comprising a transition that has been bored into the roller follower body to link the first cavity and the second cavity.

43. The roller follower body according to claim 40, further comprising a transition that has been ground into the roller follower body to link the first cavity and the second cavity.

44. The roller follower body according to claim 40, further comprising a transition that has been machined into the forgeable material so that the first and second cavities are linked.

45. The roller follower body according to claim 40, further comprising a transition that links the first and second cavities and that is in the form of a transitional tube.

46. The roller follower body according to claim 40, further comprising a transition that links the first and second cavities and that is in the form of a transition opening.

47. The roller follower body according to claim 40, wherein the second inner surface has been machined, at least in part, so that the second inner surface includes a plurality of cylindrically shaped surfaces.

48. The roller follower body according to claim 40, further comprising a first angled surface located adjacent to the first wall and the fourth wall, a second angled surface located adjacent to the first wall and the third wall, a third angled surface located adjacent to the second wall and the third wall, and a fourth angled surface located adjacent to the second wall and the fourth wall, wherein:
  a) the first angled surface extends from the first angled wall and is generally oriented to be at an angle relative to the plane of the first angled wall that measures between 65 and about 75 degrees;
  b) the second angled surface extends from the fourth angled wall and is generally oriented to be at an angle relative to the plane of the second angled wall that measures between 65 and about 75 degrees;
  c) the third angled surface extends from the second angled wall and is generally oriented to be at an angle relative to the plane of the third angled wall that measures between 65 and about 75 degrees; and
  d) the fourth angled surface extends from the third angled wall and is generally oriented to be at an angle relative to the plane of the fourth angled wall that measures between 65 and about 75 degrees.

49. The roller follower body according to claim 40, further comprising a first angled surface located adjacent to the first wall and the fourth wall, a second angled surface located adjacent to the first wall and the third wall, a third angled surface located adjacent to the second wall and the third wall, and a fourth angled surface located adjacent to the second wall and the fourth wall, wherein:
  a) the first angled surface extends from the first angled wall and is generally oriented to be at an angle relative to the plane of the first angled wall;
  b) the second angled surface extends from the fourth angled wall and is generally oriented to be at an angle relative to the plane of the second angled wall;
  c) the third angled surface extends from the second angled wall and is generally oriented to be at an angle relative to the plane of the third angled wall; and
  d) the fourth angled surface extends from the third angled wall and is generally oriented to be at an angle relative to the plane of the fourth angled wall.

50. The roller follower body of claim 49, wherein the angled surfaces are generally flat.

51. The roller follower body according to claim 49, further comprising:
 a) a transition that links the first cavity and the second cavity; and
 b) at least one of the curved surfaces terminates, at least in part, at a cylindrically shaped surface that is generally located at the transition.

52. The roller follower body according to claim 49, further comprising:
 a) a transition that links the first cavity and the second cavity; and
 b) a frusto-conically shaped surface that terminates, at least in part, at a cylindrically shaped surface generally located at the transition.

53. A roller follower body, comprising:
 a) a forgeable material that is provided with an axis, an outer surface, a first end with a first opening, and a second end with a second opening;
 b) the outer surface has, at least in part, been cold formed so that:
  i) an undercut surface extends from the second end;
  ii) the undercut surface is provided with a first diameter;
  iii) the undercut surface is adjacent to a generally cylindrical surface;
  iv) at least a portion of the outer surface is provided with a second diameter;
  v) the first diameter of the undercut surface is smaller than the second diameter;
 c) a first cavity that has, at least in part, been cold formed to provide a first inner surface that extends from the first opening and includes:
  i) a first wall, a second wall, a third wall, a fourth wall, a first angled wall, a second angled wall, a third angled wall, and a fourth angled wall that extend axially into the forgeable material;
  ii) the first wall faces the second wall and is located adjacent to the first angled wall and the fourth angled wall;
  iii) the second wall faces the first wall and is located adjacent to the second angled wall and the third angled wall;
  iv) the third wall faces the fourth wall and terminates, at least in part, at a second curved surface;
  v) the fourth wall faces the third wall and terminates, at least in part, at a first curved surface; and
 d) a second cavity that has, at least in part, been cold formed to provide a second inner surface that extends from the second opening, is generally cylindrical in shape, and is generally concentric relative to at least a portion of the outer surface.

54. The roller follower body according to claim 53, further comprising a transition that has been drilled to link the first cavity and the second cavity.

55. The roller follower body according to claim 53, further comprising a transition that has been bored into the roller follower body to link the first cavity and the second cavity.

56. The roller follower body according to claim 53, further comprising a transition that has been ground into the roller follower body to link the first cavity and the second cavity.

57. The roller follower body according to claim 53, further comprising a transition that has been machined into the forgeable material so that the first and second cavities are linked.

58. The roller follower body according to claim 53, further comprising a transition that links the first and second cavities and that is in the form of a transitional tube.

59. The roller follower body according to claim 53, further comprising a transition that links the first and second cavities and that is in the form of a transition opening.

60. The roller follower body according to claim 53, wherein the second inner surface has been machined, at least in part, so that the second inner surface includes a plurality of cylindrically shaped surfaces.

61. The roller follower body according to claim 53, further comprising a first angled surface located adjacent to the first wall and the fourth wall, a second angled surface located adjacent to the first wall and the third wall, a third angled surface located adjacent to the second wall and the third wall, and a fourth angled surface located adjacent to the second wall and the fourth wall, wherein:
 a) the first angled surface extends from the first angled wall and is generally oriented to be at an angle relative to the plane of the first angled wall that measures between 65 and about 75 degrees;
 b) the second angled surface extends from the fourth angled wall and is generally oriented to be at an angle relative to the plane of the second angled wall that measures between 65 and about 75 degrees;
 c) the third angled surface extends from the second angled wall and is generally oriented to be at an angle relative to the plane of the third angled wall that measures between 65 and about 75 degrees; and
 d) the fourth angled surface extends from the third angled wall and is generally oriented to be at an angle relative to the plane of the fourth angled wall that measures between 65 and about 75 degrees.

62. The roller follower body according to claim 53, further comprising a first angled surface located adjacent to the first wall and the fourth wall, a second angled surface located adjacent to the first wall and the third wall, a third angled surface located adjacent to the second wall and the third wall, and a fourth angled surface located adjacent to the second wall and the fourth wall, wherein:
 a) the first angled surface extends from the first angled wall and is generally oriented to be at an angle relative to the plane of the first angled wall;
 b) the second angled surface extends from the fourth angled wall and is generally oriented to be at an angle relative to the plane of the second angled wall;
 c) the third angled surface extends from the second angled wall and is generally oriented to be at an angle relative to the plane of the third angled wall; and
 d) the fourth angled surface extends from the third angled wall and is generally oriented to be at an angle relative to the plane of the fourth angled wall.

63. The roller follower body of claim 62, wherein the angled surfaces are generally flat.

64. The roller follower body according to claim 62, further comprising:
 a) a transition that links the first cavity and the second cavity; and
 b) at least one of the curved surfaces terminates, at least in part, at a cylindrically shaped surface that is generally located at the transition.

65. The roller follower body according to claim 62, further comprising:
 a) a transition that links the first cavity and the second cavity; and b) a frusto-conically shaped surface that terminates, at least in part, at a cylindrically shaped surface generally located at the transition.

66. A roller follower body, comprising:
a) a forgeable material that includes an outer surface, a first end, and a second end;
b) a first cavity that has, at least in part, been cold formed into the first end to provide a first inner surface that includes:
   i) a first wall, a second wall, a third wall, a fourth wall, a first angled wall, a second angled wall, a third angled wall, and a fourth angled wall that extend axially into the first end from a first opening;
   ii) the first wall faces the second wall and is located adjacent to the first angled wall and the fourth angled wall;
   iii) the second wall faces the first wall and is located adjacent to the second angled wall and the third angled wall;
   iv) the third wall faces the fourth wall and terminates, at least in part, at a second curved surface;
   v) the fourth wall faces the third wall and terminates, at least in part, at a first curved surface;
c) a second cavity that has, at least in part, been cold formed into the second end to provide a second inner surface that is generally concentric relative to at least a portion of the outer surface;
d) the first and second curved surfaces terminate at a transition that connects the first and second cavities; and
e) the outer surface has, at least in part, been machined so that:
   i) an undercut surface extends from the second end;
   ii) the undercut surface is provided with a first diameter;
   iii) the undercut surface is adjacent to a generally cylindrical surface;
   iv) at least a portion of the outer surface is provided with a second diameter; and
   v) the first diameter of the undercut surface is smaller than the second diameter.

67. The roller follower body according to claim 66, wherein the transition has been drilled to link the first cavity and the second cavity.

68. The roller follower body according to claim 66, wherein the transition has been bored into the roller follower body to link the first cavity and the second cavity.

69. The roller follower body according to claim 66, wherein the transition has been ground into the roller follower body to link the first cavity and the second cavity.

70. The roller follower body according to claim 66, wherein the transition has been machined into the forgeable material so that the first and second cavities are linked.

71. The roller follower body according to claim 66, wherein the transition that links the first and second cavities is in the form of a transitional tube.

72. The roller follower body according to claim 66, wherein the transition that links the first and second cavities is in the form of a transition opening.

73. The roller follower body according to claim 66, wherein the second inner surface has been machined, at least in part, so that the second inner surface includes a plurality of cylindrically shaped surfaces.

74. The roller follower body according to claim 66, further comprising a first angled surface located adjacent to the first wall and the fourth wall, a second angled surface located adjacent to the first wall and the third wall, a third angled surface located adjacent to the second wall and the third wall, and a fourth angled surface located adjacent to the second wall and the fourth wall, wherein:
a) the first angled surface extends from the first angled wall and is generally oriented to be at an angle relative to the plane of the first angled wall that measures between 65 and about 75 degrees;
b) the second angled surface extends from the fourth angled wall and is generally oriented to be at an angle relative to the plane of the second angled wall that measures between 65 and about 75 degrees;
c) the third angled surface extends from the second angled wall and is generally oriented to be at an angle relative to the plane of the third angled wall that measures between 65 and about 75 degrees; and
d) the fourth angled surface extends from the third angled wall and is generally oriented to be at an angle relative to the plane of the fourth angled wall that measures between 65 and about 75 degrees.

75. The roller follower body according to claim 66, further comprising a first angled surface located adjacent to the first wall and the fourth wall, a second angled surface located adjacent to the first wall and the third wall, a third angled surface located adjacent to the second wall and the third wall, and a fourth angled surface located adjacent to the second wall and the fourth wall, wherein:
a) the first angled surface extends from the first angled wall and is generally oriented to be at an angle relative to the plane of the first angled wall;
b) the second angled surface extends from the fourth angled wall and is generally oriented to be at an angle relative to the plane of the second angled wall;
c) the third angled surface extends from the second angled wall and is generally oriented to be at an angle relative to the plane of the third angled wall; and
d) the fourth angled surface extends from the third angled wall and is generally oriented to be at an angle relative to the plane of the fourth angled wall.

76. The roller follower body of claim 75, wherein the angled surfaces are generally flat.

77. The roller follower body according to claim 75, wherein
at least one of the curved surfaces terminates, at least in part, at a cylindrically shaped surface that is generally located at the transition.

78. The roller follower body according to claim 75, further comprising:
a frusto-conically shaped surface that terminates, at least in part, at a cylindrically shaped surface generally located at the transition.

* * * * *

UNITED STATES PATENT AND TRADEMARK OFFICE
CERTIFICATE OF CORRECTION

| | |
|---|---|
| PATENT NO. | : 7,273,026 B2 |
| APPLICATION NO. | : 10/316261 |
| DATED | : September 25, 2007 |
| INVENTOR(S) | : Dhruva Mandal and Carroll Williams |

It is certified that error appears in the above-identified patent and that said Letters Patent is hereby corrected as shown below:

Col. 1 line 5, the Field of the Invention, which reads "-relates to bodies for toilet followers,-" should be changed to -- relates to bodies for roller followers -- so that the Filed of the Invention matches the Application as filed;

Column 9, line 4, the preamble of Claim 8, which reads "-The toilet-" should be changed to --The roller-- so that Claim 8 matches Claim 103 of the June 6, 2007 Amendment;

Column 10, line 36, Claim 15, which reads "-has been dilled-" should be changed to --has been drilled-- so that Claim 15 matches Claim 110 of the June 6, 2007 Amendment; and Column 12, line 19, Claim 28, which reads "-has been dilled-" should be changed to -- has been drilled-- so that Claim 28 matches Claim 123 of the June 6, 2007 Amendment.

Signed and Sealed this

Eleventh Day of December, 2007

JON W. DUDAS
*Director of the United States Patent and Trademark Office*